(12) United States Patent
Fee et al.

(10) Patent No.: US 7,669,238 B2
(45) Date of Patent: Feb. 23, 2010

(54) EVIDENCE-BASED APPLICATION SECURITY

(75) Inventors: Gregory D. Fee, Seattle, WA (US);
Aaron Goldfeder, Seattle, WA (US);
John M. Hawkins, Duvall, WA (US);
Jamie L. Cool, Redmond, WA (US);
Sebastian Lange, Seattle, WA (US);
Sergey Khorun, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 869 days.

(21) Appl. No.: 10/705,756

(22) Filed: Nov. 10, 2003

(65) Prior Publication Data

US 2004/0148514 A1 Jul. 29, 2004

Related U.S. Application Data

(63) Continuation-in-part of application No. 09/598,814, filed on Jun. 21, 2000, now Pat. No. 7,131,143.

(51) Int. Cl.
*H04L 9/00* (2006.01)

(52) U.S. Cl. ............................. 726/22; 726/27; 726/30; 726/1; 726/4; 380/29; 713/190; 713/156; 713/167; 713/170; 713/187

(58) Field of Classification Search ................. 713/200; 726/22, 27, 30
See application file for complete search history.

(56) References Cited

U.S. PATENT DOCUMENTS

| 5,715,403 | A |   | 2/1998  | Stefik          |        |
|-----------|---|---|---------|-----------------|--------|
| 5,915,085 | A | * | 6/1999  | Koved           | 726/1  |
| 5,958,050 | A |   | 9/1999  | Griffin et al.  |        |
| 5,978,484 | A |   | 11/1999 | Apperson et al. |        |
| 6,044,466 | A |   | 3/2000  | Anand et al.    |        |
| 6,044,467 | A | * | 3/2000  | Gong            | 726/4  |
| 6,138,238 | A | * | 10/2000 | Scheifler et al.| 726/17 |

(Continued)

FOREIGN PATENT DOCUMENTS

WO  WO 99/30217  6/1999

OTHER PUBLICATIONS

International Search Report for PCT/US01/16057.

(Continued)

*Primary Examiner*—Kambiz Zand
*Assistant Examiner*—Yonas Bayou
(74) *Attorney, Agent, or Firm*—Lee & Hayes, PLLC

(57) ABSTRACT

Evidence-based application security may be implemented at the application and/or application group levels. A manifest may be provided defining at least one trust condition for the application or application group. A policy manager evaluates application evidence (e.g., an XrML license) for an application or group of applications relative to the manifest. The application is only granted permissions on the computer system if the application evidence indicates that the application is trusted. Similarly, a group of applications are only granted permissions on the computer system if the evidence indicates that the group of applications is trusted. If the application evidence satisfies the at least one trust condition defined by the manifest, the policy manager generates a permission grant set for each code assembly that is a member of the at least one application. Evidence may be further evaluated for code assemblies that are members of the trusted application or application group.

30 Claims, 10 Drawing Sheets

U.S. PATENT DOCUMENTS

| | | | |
|---|---|---|---|
| 6,345,361 B1* | 2/2002 | Jerger et al. | 726/3 |
| 6,389,540 B1* | 5/2002 | Scheifler et al. | 726/21 |
| 6,526,513 B1* | 2/2003 | Shrader et al. | 726/4 |
| 6,604,198 B1 | 8/2003 | Beckman et al. | |
| 6,704,804 B1* | 3/2004 | Wilson et al. | 719/315 |
| 7,051,366 B1* | 5/2006 | LaMacchia et al. | 726/14 |
| 7,076,557 B1* | 7/2006 | LaMacchia et al. | 709/229 |
| 2002/0198845 A1 | 12/2002 | Lao et al. | |
| 2003/0009424 A1 | 1/2003 | Ta et al. | |
| 2003/0041267 A1* | 2/2003 | Fee et al. | 713/201 |
| 2003/0061065 A1* | 3/2003 | Keeley | 705/1 |
| 2003/0194085 A1* | 10/2003 | Dillaway | 380/29 |
| 2003/0196091 A1 | 10/2003 | Raley et al. | |
| 2003/0196121 A1 | 10/2003 | Raley et al. | |
| 2003/0220880 A1* | 11/2003 | Lao et al. | 705/51 |

OTHER PUBLICATIONS

International Search Report for PCT/US01/16127.

Anand, R., Islam, N., Jaeger, T., Rao, J. R.; A Flexible Security Model for Using Internet Content Proceedings of the 16th Symposium on Reliable Distribuited Systems SRDS 1997 Durham NC, pp. 89-96.

"Logically Extensible Privilege Control Set" IBM Technical Disclosure Bulletin, IBM Corp. NY NY, vol. 34, No. 7B, Dec. 1, 1991, pp. 106-109.

"Decentralized Trust Management", by M. Blaze, J. Feigenbaum, J. Lacy, in Proceedings of the 1996 IEEE Symposium on Security and Privacy, pp. 164-173. Also available as a DIMACS Technical Report. This paper describes PolicyMaker. Available in Postscript at http://www.

"Proceedings of the Sixth International World Wide Web Conference", Santa Clara, CA, Apr. 1997, by Y. Chu, J. Fiegenbaum, B. LaMacchia, P. Resnick, M. Strauss, REFEREE: Trust Management for Web Applications. Available from http://www.farcaster.com/papers/www6-referee/index.htm.

"The Role of Trust Management in Distributed System Security", M. Blaze, J. Feigenbaum, J. Ionnidis, A. Keromytis, Secure Internet Programming: Security Issues for Distributed and Mobile Objects, Lecture Note sin COmputer Science, vol. 1603, Springer, Gerlin, 1999, pp. 185-210.

"Managing Trust in an Information-Labeling System", European Transactions on Telecommunications, 8(1997), pp. 491-501. (Special issue of selected papers from the 1996 Amalfi Conference on Secure Communication in Networks.) Postscript from http://www.research.att.com/.

* cited by examiner

EVIDENCE-BASED APPLICATION SECURITY

CROSS-REFERENCE TO RELATED APPLICATIONS

The present application is a continuation-in-part of and claims priority from U.S. patent application Ser. No. 09/598,814 entitled EVALUATING INITIALLY UNTRUSTED EVIDENCE IN AN EVIDENCE-BASED SECURITY POLICY MANAGER filed on Jun. 21, 2000, now U.S. Pat. No. 7,131,143 and assigned to the Assignee of the present invention, which is hereby incorporated herein for all that it discloses. The present application is related to U.S. patent application Ser. No. 09/599,015 entitled FILTERING A PERMISSION SET USING PERMISSION REQUESTS ASSOCIATED WITH A CODE ASSEMBLY filed on Jun. 21, 2000, U.S. patent application Ser. No. 09/598,534, entitled EVIDENCE-BASED SECURITY POLICY MANAGER filed on Jun. 21, 2000, and U.S. patent application Ser. No. 10/162,260 entitled PARTIAL GRANT SET EVALUATION FROM PARTIAL EVIDENCE IN AN EVIDENCE-BASED SECURITY POLICY MANAGER filed on Jun. 5, 2002, each assigned to the Assignee of the present invention.

TECHNICAL FIELD

The invention relates generally to computer security, and more particularly to evaluating evidence for applications or groups of applications.

BACKGROUND OF THE INVENTION

Security risks, such as allowing unauthorized access to a user's system, are inherent with many on-line activities. Therefore, security mechanisms have been developed to protect users' systems. For example, a user may download an on-demand application from the Internet and execute the application from within the browser. To prevent an unauthorized access to the user's system resources (e.g., a directory on the user's hard disk), the user's system is protected by "sandbox" security that is enforced within the browser environment. Sandbox security involves a limited, secure area of computer memory in which an application may execute, so that the application is prevented from accessing system resources that reside outside of the secure area.

In some circumstances, however, a user may wish to allow a downloaded application controlled access to certain resources within the user's system. For example, a user may wish to use an on-demand word processing application to generate a document and then save the document to a directory in the user's system.

Existing approaches for providing such applications with secure, controlled access to a user's system are too cumbersome and inflexible. In one method, for example, a security policy is defined within a policy database in which a given application is associated with a set of permissions. The security policy, in combination with origin information, signature information, and access restrictions, helps define a "trusted" relationship between the application and the user's system.

Consider the following example:

```
grant codeBase "http://www.BobsWidgets.com" signed by
BobsCertificate {
        permission lang.io.FilePermission "/tmp/" "read";
        permission lang.io.FilePermission "/tmp/bwdir/*" "write";
}
```

In the example, an applet from the source location, "www.BobsWidgets.com", is granted certain file access permissions if it is signed with a key corresponding to another key contained within BobsCertificate. An applet is traditionally a program designed to be executed from within a browser, rather than directly from within the operating system. The applet is granted permission to read files from the "/tmp" directory on the host system and to create and write to files in the "/tmp/bwdir" directory. Permission to "execute" is another common permission modifier. Other security policy specifications may, for example, grant broad permissions to access any file in any system location, regardless of the application's source or whether the application is unsigned or signed.

In such approaches, a security policy manager uses self-verifying information, such as the certificate, to determine which permissions the applet (or any code assembly) should be granted. However, in some situations, the information associated with the applet is not self-verifying and may be considered "untrusted". For example, assume that a user has installed an encryption library on a computer system after purchasing a restricted license allowing the user to call the library from a given application. At some later point, the user may attempt to download and execute a different application that also includes calls to the encryption library. A code assembly within the second application may include an embedded certificate, signed by the library vendor, indicating that the code assembly vendor has also purchased rights to call the vendor's library on a user's system. However, because the certificate is provided by the application vendor and not the library vendor, the certificate may be untrusted.

By relying upon untrusted information, a policy manager may improperly grant permissions to the applet or application and expose the system to security risks. The unanswered problem is how to safely determine the appropriate permissions to be granted to an application (or any code assembly) using potentially untrustworthy information. In addition, there has yet to be a way for policy managers to enforce and grant trust to code assemblies executing in the context of a particular application.

SUMMARY OF THE INVENTION

Evidence-based application security may be implemented at the application and/or application group levels. A manifest may be provided defining an application and/or application group, and evidence for trusting the application or application group. A policy manager evaluates application evidence (e.g., an XrML license) relative to one or more conditions for trusting the application or application group. The conditions may be defined, for example, in a security policy specification. The application is only granted permissions on a computer system if the application evidence satisfies the condition for trusting the application. Similarly, a group of applications is only granted permissions on a computer system if the application evidence satisfies the condition for trusting the group of applications. If the application or application group is trusted, the policy manager generates a permission grant set for each code assembly that is a member of the at least one application. Evidence may be further evaluated for code assemblies that are members of the application or application group.

In one implementation, a method is provided for evidence-based application security. The method generating a permission grant set for each code assembly that is a member of at least one trusted application if application evidence for the at least one application satisfies at least one trust condition. In another implementation, the method includes trusting a group of applications if application evidence for the group of applications satisfies at least one trust condition.

In another implementation, a system is provided for evidence-based application security. The system includes a manifest defining at least one application, and application evidence for the at least one application. A policy manager evaluates the application evidence relative to at least one condition for trusting the at least one application, wherein the policy manager generates a permission grant set for each code assembly that is a member of the at least one application if the application evidence satisfies the at least one trust condition defined by the manifest. In another implementation, the system may comprise an XrML program authorization module operatively associated with the policy manager for evaluating application evidence including at least one XrML license.

In other implementations, articles of manufacture are provided as computer program products. One implementation of a computer program product provides a computer program storage medium readable by a computer system and encoding a computer program for executing a computer process. The computer process includes trusting at least one application if application evidence for at least one application satisfies at least one trust condition, and generating a permission grant set for each code assembly that is a member of at least one trusted application. In another implementation, the computer process includes trusting a group of applications if application evidence for the group of applications satisfies at least one trust condition.

In still another implementation, a computer-readable medium having a data structure stored thereon is provided. The data structure includes a first data field specifying members of at least one application. A second data field contains application evidence associated with the at least one application. Permission grant sets are generated for each member of the at least one application based on the application evidence.

DETAILED DESCRIPTION OF THE INVENTION

Evidence-based application security may be implemented at the application and/or application group levels. When an application or application group is received, it is initially untrusted to prevent unauthorized access to protected areas (e.g., a file system of a computer). Evidence is evaluated to determine whether the application or application group should be trusted.

A manifest may define one or more applications and/or application groups, and evidence to be evaluated during a trust decision. Manifest may be used by the policy manager in making these trust decisions. The policy manager evaluates application evidence for the application or application group relative to one or more conditions defined by a security policy specification. If the application evidence satisfies the condition(s) for trusting an application or application group, the application components (e.g., code assemblies) can be executed on the computer system.

The application components may be further evaluated relative to code evidence before the application and/or application group is executed on the computer system by the policy manager.

The policy manager may include execution modules for parsing the manifest, evaluating membership of the received code assembly in one or more applications, and generating a permission grant set for the code assemblies. If the application evidence satisfies the conditions for trusting an application or application group, the policy manager computes the appropriate permission grants for the application component (e.g., code assembly) and passes a resulting permission grant set to the run-time call stack. Each code assembly belonging to the application or application group may be associated with a corresponding permission grant set.

In one implementation, if an application or group of applications attempts to access a resource outside of that which is allowed by the corresponding permission grant set requests the user to make an additional trust decision, which is then persisted each time the application or group of applications attempt to access the resource.

Figure 1:
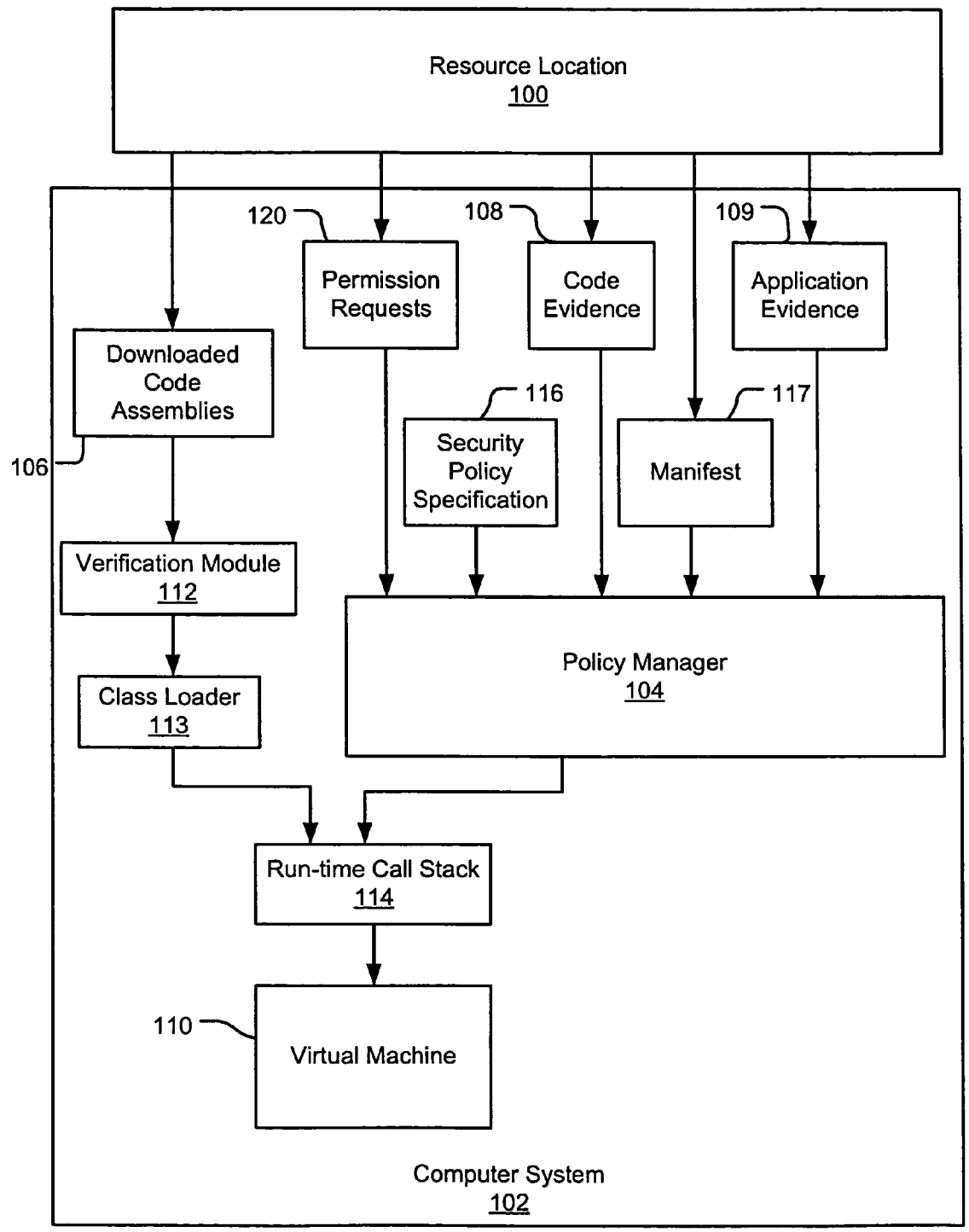
FIG. 1 depicts an evidence-based security policy manager according to one implementation.

FIG. 1 depicts an implementation of an evidence-based security policy manager 104. A resource location 100, such as a Web server, is accessible by a computer system 102 (e.g., a Web client or server) across a network (not shown). A resource location is commonly indicated by a URI (Uniform Resource Identifier), which is a generic term for all types of names and addresses that refer to objects on the World Wide Web. A URL (Uniform Resource Locator) is a kind of URI. Exemplary resources may include without limitation documents, images, audio data, applications, routines, and other data and code datastores accessible through a network. It should be understood that a resource location may be local to the computer system 102 or remote to the computer system 102 (e.g., coupled by the Internet).

Figure 9:
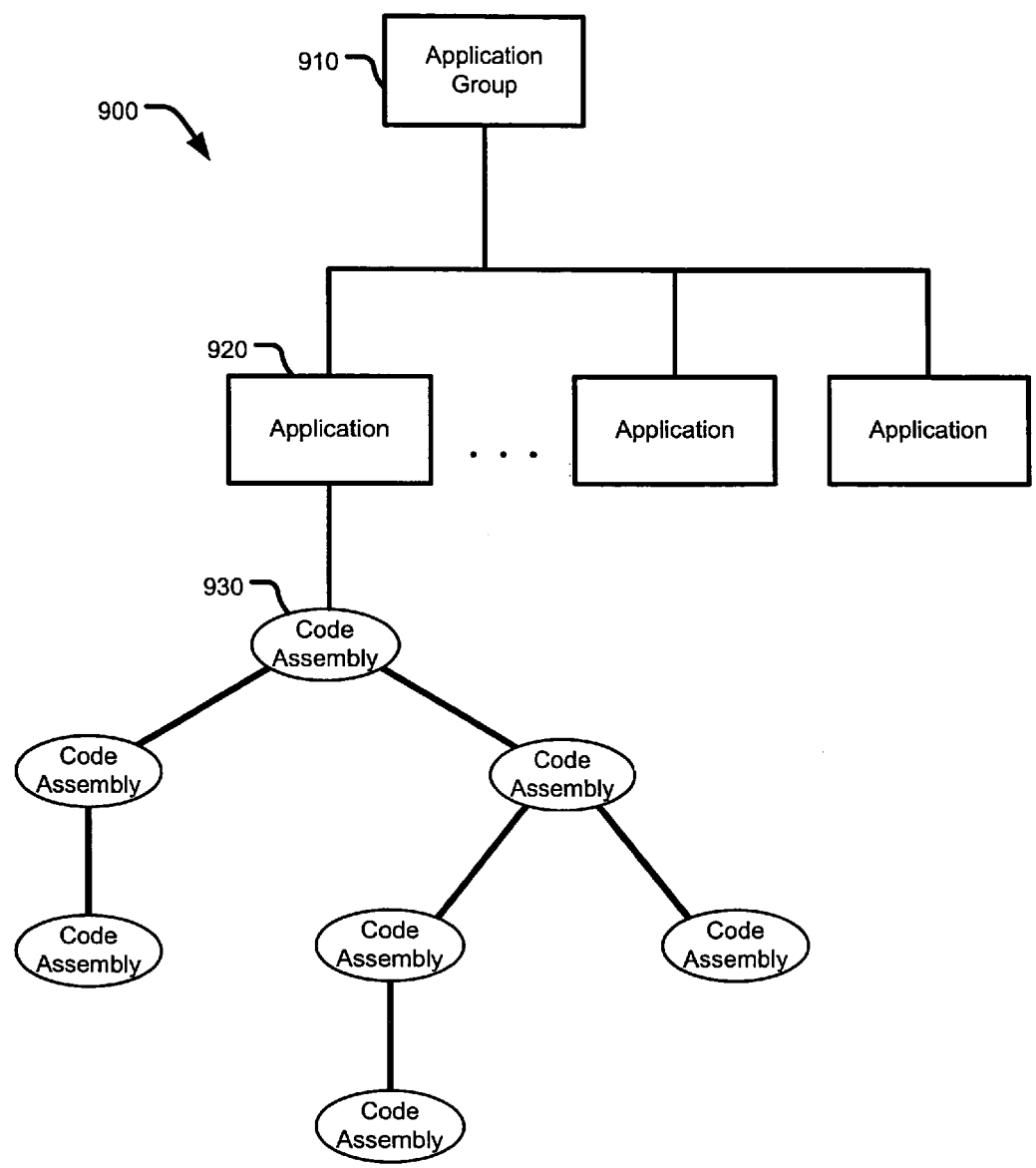
FIG. 9 illustrates an exemplary implementation of applications and groups of applications.

Resources may include applications, application groups, and/or code assemblies, (e.g., illustrated in FIG. 9). One type of resource is a code assembly. Generally, a code assembly is a unit of packaged code, such as a .EXE file or a .DLL file. A code assembly may, for example, consist of applet code, application code, class code, routine code, and data. Code and data included in a code assembly may be in the form of byte-codes, intermediate code, machine code, or other code types, and data components (classes, images, audio and video clips, etc.). Furthermore, a code assembly may be packaged in an archive file containing one or more classes downloaded from a resource location. In one implementation, classes of an application are combined into a module (an output of a linking process), and one or more modules may be combined into a code assembly.

FIG. 1 is described relative to a downloaded application executing on a computer system 102. Alternative embodiments may include downloaded applets, ACTIVEX controls, and other routines and objects. An exemplary downloaded application consists of objects defined in one or more local or remote code assemblies. Local code assemblies are stored within the computer system 102 and are loaded into memory when needed. Remote code assemblies are downloaded from one or more resource locations, such as resource location 100.

The computer system 102 initiates a run-time environment to execute the downloaded application and to manage security of the computer system 102. The run-time environment on the computer system 102 may be initialized by a "trusted host", such as an operating system shell, a browser, an SQL server, or other code that is external to the run-time environment. The host, the loader 113, or some other shared resource initiates execution of the application by downloading the various code assemblies 106 that constitute the application to the computer system 102 and passing the code assemblies 106 to a virtual machine 110 for execution.

A virtual machine provides a self-contained operating environment that performs much of the functionality of a separate computer. For example, an application can run in a virtual machine without direct access to the host operating system. This design has at least two advantages:

System Independence: An application will run the same in any virtual machine that supports the programming language in which the application is written, regardless of the hardware and software underlying the system. For example, the same application (i.e., the same programming code) can run in a virtual machine on different computer systems having different types of microprocessors and different types of operating systems.

Security: Applications running in a virtual machine are generally prevented from accessing protected system resources (i.e., the operating system, the file system, protected regions of memory, a connected network or peripheral). It should be understood, however, that an embodiment of the present invention can evaluate evidence and a security policy to determine whether to permit an application to access protected system resources. If permission for a given operation is granted, the application is considered "trusted" for that operation.

As the application components (e.g., downloaded code assemblies 106) are received by the computer system 102, a verification module 112 ensures that downloaded code in the code assemblies 106 is properly formatted and does not violate the safety restrictions of the code language or the virtual machine 110. Specifically, the safety restrictions that are to be enforced prevent potentially malicious code from accessing data other than through the well-defined interfaces of the code. It is important that verified code be unable to examine or modify the granted permission sets that are associated with the code assembly through mechanisms that are inaccessible to the code assembly (i.e., accessible only to the execution environment). Other verifications, such as verifying that pointer addressing is not present, that internal stacks cannot overflow or underflow, and that code instructions will have the correct typed parameters, may also be performed. The code assemblies are then passed to a class loader 113, which can ensure that the application does not replace system-level components within the run-time environment (e.g., the class loader can force host-provided code assemblies to be executed when requested, thereby superceding name conflicts with downloaded code assemblies). Thereafter, the class loader 113 loads the code assemblies 106 onto a run-time call stack 114 in response to requests from the virtual machine 110.

Figure 2:
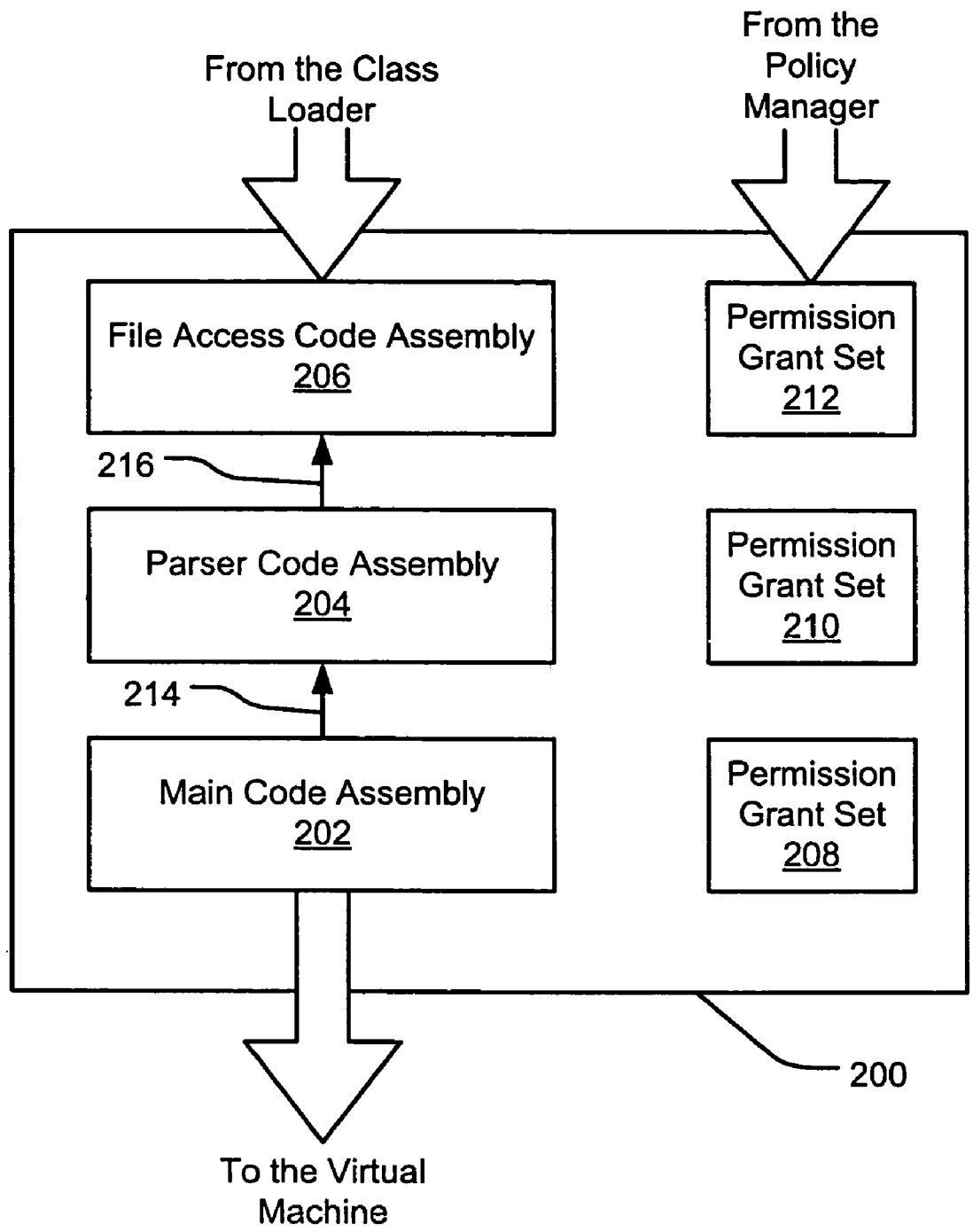
FIG. 2 represents a run-time call stack according to one implementation.

For example, the virtual machine executes a first code assembly (e.g., main code assembly 202 of FIG. 2) that calls a routine provided by a second code assembly (e.g., parser code assembly of FIG. 2). The class loader 113 receives the virtual machine's request for the second code assembly and loads the second code assembly into the run-time call stack 114 so that the first code assembly can call the needed routine.

In order to ensure that unauthorized accesses to protected areas are prevented, evidence 108 associated with each of the downloaded code assemblies 106 is input to the policy manager 104. Although evidence 108 is shown as being received from resource location 100, evidence 108 may also be received from one or more other resource locations or from within the computer system 102. For example, in one embodiment, an element of evidence may be hard-coded in the security policy specification 116, a configuration file, or a system registry. Furthermore, evidence may be dynamically generated, internally or externally to the computer's system, responsive to receipt of the code assembly. The policy manager 104 determines the permission grant set associated with each code assembly. A security policy specification 116 is also input to the policy manager 104 to assist in the computation of appropriate grants. Based on these inputs, the policy manager 104 computes the appropriate grants for each code assembly and passes a resulting permission grant set to the run-time call stack 114.

As such, each code assembly in the run-time call stack 114 is associated with a corresponding permission grant set (e.g., permission grant sets 208, 210, and 212 in FIG. 2). A grant set is received from the policy manager and defines various permissions that have been computed for a corresponding code assembly. The permissions associated with each code assembly may vary widely based on the relative origin of the code assembly (e.g., local or remote), the specific origin of the code assembly (e.g., a specific URL), or other trust characteristics of the code assembly, all of which may be referred to as "evidence" 108. Exemplary trust characteristics may include cryptographic strong names, AUTHENTICODE signatures, and other security related evidence. In an embodiment of the present invention, evidence is used to determine a permission grant set for a given code assembly, method, module, or class. Furthermore, a security policy specification 116 may define multiple policy levels within a security framework for a given enterprise, machine, user, application, etc. in which the evidence of a given code assembly is evaluated.

Evidence-based security is not limited to the code assembly level. For example, evidence may be evaluated for application components (e.g., code assemblies) in addition to a trust decision being made at an application and/or application group level. Evaluating evidence at more than one level increases the granularity of security that can be provided.

FIG. 9 illustrates an exemplary hierarchy 900, including an application group 910, applications 920, and application components 930 (e.g., code assemblies). Application groups 910, applications 920, and application components 930 may be stored within the computer system and/or downloaded or accessed at one or more resource locations (e.g., resource location 100 in FIG. 1).

Application components 930 are shown in FIG. 9 as being members of application 920, which in turn is a member of application group 910. However, application components 930 can also be members of more than one application 920 and applications 920 can also be members of more than one application group 910.

At the application level, an application is only granted permissions on the computer system if the application evidence indicates that the application is trusted. At the application group level, a group of applications are only granted permissions on the computer system if the evidence indicates that the group of applications is trusted. These implementations may be particularly desirable, for example, by programmers and system administrators who generally manage security at a high level.

Trust decisions can be made at any level in the hierarchy 900 and can also be made across multiple levels in the hierarchy 900. In one exemplary implementation, an application group may be granted permissions on the computer system if it is a trusted application group 910. Similarly, an application may be granted permissions on the computer system if it is a trusted application 920. In another exemplary implementation, an application component 930 may be trusted only if it is a member of a trusted application 920 that is also a member of a trusted application group 910. Other implementations are also possible and may depend on various design considerations. For example, the granularity at which evidence is evaluated for making trust decisions may depend at least to some extent on the desired level of security.

In addition, an application component may be a member of different applications each having a different level of trust. An application component may even be a member of a trusted application and also a member of an untrusted application. Similarly, an application may be a member of different application groups each having different levels of trust, and even a member of both a trusted application group and an untrusted application group.

According to one implementation of making trust decisions at the application and/or application group level, the computer system 102 shown in FIG. 1 receives a manifest 117. Manifest 117 may define one or more applications and/or application groups, and evidence to be evaluated relative to a security policy specification 116 during a trust decision. In an alternative implementation, evidence may be provided from other sources in addition to, or instead of being provided in manifest 117.

Manifest 117 may also identify the components of the application and/or application group in addition to providing system and/or network locations of the applications and/or application components (e.g., code assemblies). Optionally, manifest 1117 may be provided with a cryptographic signature, or "fingerprint," that can be used to validate the manifest itself (e.g., to determine whether the manifest has been altered by someone other than the application publisher).

In one exemplary embodiment, manifest 117 may include a data structure including a number of data fields, as illustrated in Table 1.

TABLE 1

Exemplary Manifest

| Field | Contents |
| --- | --- |
| Application (OR Application Group) Members | file1.dll; file2.exe . . . (OR App1; App2 . . . ) |
| Location of Member(s) | company1.com; company 2.com . . . XrML license |
| Application Evidence | |
| Requested Level of Trust for Application Members (OR Application Group Members) | file1.dll - read/write; file2.exe - read only (OR Appl - read, write, execute; App2 - read only) |

A first data field defines the application or application group. Another data field may contain application evidence. A third data field may contain a requested level of trust for the at least one application defined in the first data field. The application evidence is evaluated to determine whether the application or application group should be granted the level of trust requested in manifest 117.

Manifest 117 may be received from resource location 100 or may already reside on the computer system 102 for use by the policy manager in making trust decisions. To prevent unauthorized access to protected areas, application evidence 109 for the application or application group may be evaluated by the policy manager 104 relative to one or more conditions defined in the security policy specification 116. If the application evidence 109 satisfies the conditions for trusting an application or application group, the application and/or application group is trusted and can be executed on the computer system 102.

Any type of evidence may be provided in any form and from any source to evaluate whether an application and/or application group is trusted. For example, application evidence may be provided with the application itself, including without limitation, cryptographic strong names; AUTHENTICODE signatures; URL, site, and/or zone of deployment; URL site, and zone of update; X509 certificate identity; XrML license; and other security and privacy related evidence. Application evidence may also be provided from sources other than the application, including without limitation, interaction with the user, evaluation of previous trust decisions, and XrML licenses.

The policy manager may be implemented, for example, as a trust manager to evaluate one or more types of evidence. In one exemplary implementation, where the application evidence includes XrML licenses, the policy manager may be provided with an XrML authorization module to evaluate XrML licenses. In addition, trust manager may be implemented to evaluate multiple levels of evidence, alternative forms of evidence, and arbitrarily defined evidence.

As an additional level of security, each application component (e.g., code assembly) may optionally be evaluated before the application and/or application group is executed on the computer system 102 by the policy manager to determine whether the application component is a member of the application and/or application group. If the application component is not a member of the application or application group (i.e., the component is not defined in the manifest 117 for an application or application group), the component cannot be executed on the computer system 102.

As yet another level of security, code evidence 108 may optionally be evaluated for the application components (e.g., code assembly) before the application and/or application group is executed on the computer system 102. If the code evidence 108 does not satisfy the condition(s) for trusting the application component, the component cannot be executed on the computer system 102.

If it is determined that the application evidence 109 satisfies the conditions for trusting an application or application group, and optionally that the application component is trusted and is a member of the trusted application or application group, the trust manager computes the appropriate permission grants for the application component (e.g., code assembly) and passes a resulting permission grant set to the run-time call stack 114. Each code assembly belonging to the application or application group is associated with a corresponding permission grant set (e.g., permission grant sets 208, 210, and 212 in FIG. 2).

In an exemplary implementation, trust manager maps a collection of code assemblies (e.g., an application or application group) to permission sets corresponding to the level of trust for the application or application group. Grant sets may also be associated based on dynamic conditions. For example, if code assemblies from a trusted source (e.g., "mycompany-.com") may be loaded without further evaluation, these code assemblies may each be associated with grant set "P". Code assemblies with grant set "P" do not need to be evaluated by the trust manager and can be immediately loaded and/or executed on the computer system.

Trust manager may also grant different degrees or levels of trust to an application or application group. The decision to trust the application or application group may be based, at least in part, on the level of trust that is requested in manifest 117. Higher levels of trust may, for example, require that more conditions be satisfied or that more stringent conditions be satisfied. For example, an application that requests a high level of trust (e.g., read, write, and execute) may fail more trust conditions than an application that requests a lower level of trust (e.g., read only), assuming that the applications otherwise provide the same application evidence.

FIG. 2 represents a run-time call stack 200 containing individual code assemblies that are stacked in the order in which they were called. The individual code assemblies may be downloaded from a remote resource location or may be retrieved locally from the computer system 102 of FIG. 1. The individual code assemblies are loaded into the run-time call stack 114 by the class loader 113 for access and execution by the virtual machine 110 in FIG. 1. Alternatively, the grant sets 208, 210, and 212 may be stored separately from the stack 200 and accessed individually when required.

An alternative run-time call stack includes a slot for every method in a call chain. A grant set can be associated with each code assembly, class, module, or method in the call chain. In one embodiment, methods from a single assembly are associated with the same permission grant set. As such, the permission grant set need only be checked when the call chain transitions to a method in another code assembly (i.e., calls made within the same code assembly may not require a permission grant set check). Alternatively, methods, modules, or classes may be associated with distinct permission grant sets within the scope of the present invention.

For example, an object of the main application class in code assembly 202 is loaded first by the class loader into the illustrated run-time call stack 200. As the virtual machine executes the main class, the main class creates a parser object from a code assembly 204 and calls a method in the parser object to parse a data file in a protected area of the computer system. Accordingly, the class loader loads the parser code of the code assembly 204 into the run-time call stack 200. Thereafter, the parser object creates a file access object from a code assembly 206 and calls a method in the file access object to perform a read operation on the protected file. Accordingly, the class loader loads the file access code of the code assembly 206 into the run-time call stack 200.

Each permission grant set corresponds to a code assembly, method, module, or class in the run-time call stack. As such, a code assembly's attempt to access a protected resource is evaluated against its associated permission grant set, as well as the permission grant sets of other code assemblies in the run-time call stack 200. In the example of the read operation to the protected file by the application illustrated in FIG. 2, the main code assembly 202 is associated with a permission grant set 208. The main code assembly 202 calls (as represented by arrow 214) a method in the parser code assembly 204, which is associated with the permission grant set 210. In order to access the protected file, the parser code assembly 204 calls (as represented by arrow 216) a method in the file access code assembly 206, which is associated with the permission grant set 212. In order to determine whether the file access code assembly 206 can access the protected file, the "intersection" of the permission grant sets 208 and 210 is calculated and used to determine whether the file access operation is permitted. For example, if the permission grant set 210 includes a permission to read from the protected file, but the permission grant set 208 does not, then access to the protected file is denied. In alternative embodiments, other logical operations may be employed to determine whether the file access operation is permitted.

Generally, an "intersection" operation (represented by the symbol "∩") is a set operation that yields the common elements of the operand sets. For example, if Set1 includes elements A, B, and C, and Set2 includes elements B, C, and D, then the intersection of Set1 and Set2 (i.e., Set1 ∩ Set2) equals B and C. In contrast, a "union" operation (represented by the symbol "∪") is a set operation that yields all elements in the operand sets (i.e., the non-duplicative aggregation of all the elements in the sets). For example, if Set1 includes elements A, B, and C, and Set2 includes elements B, C, and D, then the union of Set1 and Set2 (i.e., Set1 ∪ Set2) equals A, B, C and D.

Figure 3:
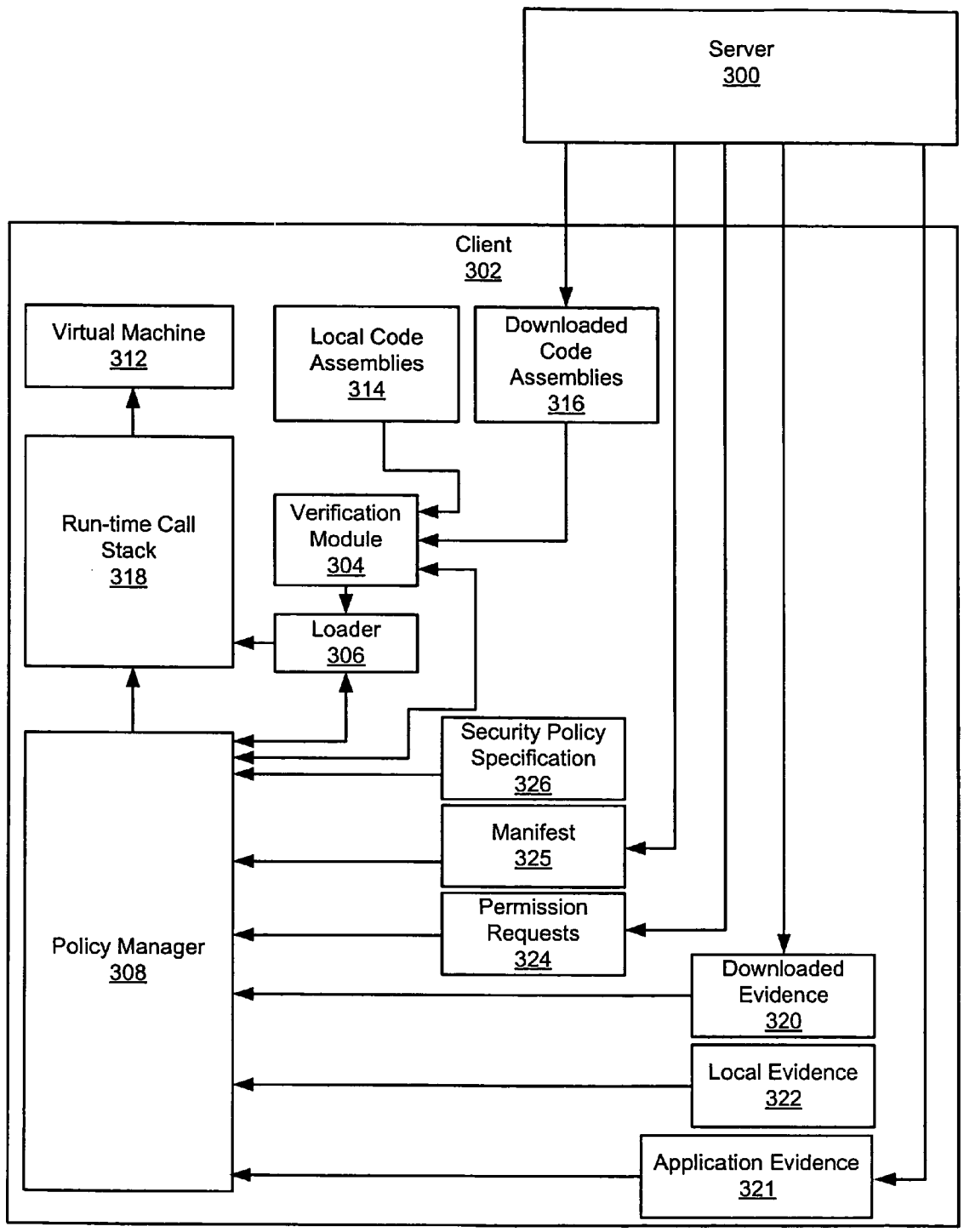
FIG. 3 depicts a computer system for managing evidence-based security according to one implementation.

FIG. 3 depicts a computer system for managing evidence-based security in an embodiment of the present invention. A server 300 is coupled to a client 302 via a communications network (not shown). The client 302 executes a run-time environment (e.g., the COM+2.0 Run-time environment or .Net Framework Common Language Runtime, both from Microsoft Corporation) to manage execution of applications on the client 302. In an embodiment of the present invention, the run-time environment includes a verification module 304, a loader module 306, and a policy manager 308.

As previously discussed, code assemblies are loaded into a run-time call stack 318 for execution by a virtual machine 312. A first category of code assembly is represented by local code assemblies 314, which are generally considered trusted code assemblies because they originate on the client 302. In contrast, a second category of code assembly is represented by downloaded code assemblies 316, which may originate from a remote or untrusted resource location, such as the server 300. Although local code assemblies 314 are generally trusted and downloaded code assemblies 316 are generally untrusted (at least initially), this convention may be controlled by the security policy specification 326 and may be modified to meet an administrator's needs. In an embodiment of the present invention, local code assemblies 314 and downloaded code assemblies 316 are input to the verification module 304 for verification. Thereafter, the code assemblies are input to the loader module 306 to be loaded into the run-time call stack 318.

The code assemblies 316 and 318 are generally associated with evidence (or credentials) used to compute a permission grant set for each code assembly. One exemplary evidence component may be an AUTHENTICODE signature. Another exemplary evidence component is a PICS (Platform for Internet Content Selection) label, which states properties of an Internet resource (e.g., executable code that has been virus checked). More details regarding a PICS label are discussed in P. Resnick and J. Miller, "PICS: Internet Access Controls without Censorship," Communications of the ACM, 39 (1996), pp. 87-93; also available at www.w3.org/pub/WWW/PICS/iacwcv2.htm. Other examples of evidence may include, without limitation, proofs of purchase or license, author identifiers, vendor identifiers, versioning information, and programmatic credentials. Programmatic credentials, for example, may be in the form of program code that examines statements made by other credentials and fetches supplementary information from the network before deciding which evidentiary statements to provide to the policy manager 308.

Evidence about a code assembly, method, module, class, application or application group may be provided by the host or extracted from the code assembly or manifest itself. Application evidence 321 is generally provided in the manifest, although application evidence 321 may also be provided from other sources. Generally, local or host-provided evidence 322 is implicitly trusted and believed to be true, although this convention may be modified by the security policy. However, downloaded or assembly provided evidence 320 is generally untrusted and must either be self-verifying (e.g., digitally-signed) or independently verified, although this convention may also be modified by the security policy. Downloaded evidence 320 may be downloaded from one or more resource locations and is not limited to evidence downloaded from the resource location from which the code assembly originates.

Local evidence 322 and downloaded evidence 320 are input to the security manager 308, which evaluate the evidence based on the security policy. Within the policy manager 308, the evidence is evaluated in combination with the security policy specification 326 (and optionally permission requests 324, which define a permission set requested by the code assembly) to generate a final permission grant set that corresponds with a given code assembly.

Furthermore, because the verification process at the verification module 304 and the security management process at the policy manager 308 can execute concurrently, the two processes can communicate to affect each other. For example, the policy manager 308 may evaluate evidence indicating that a given code assembly is guaranteed to be type safe. Accordingly, this type safety guarantee can be communicated to the verification module 304, which may skip a type checking operation based on the information. Alternatively, the verification module 304 may determine that a given code assembly does not pass a type safety check. In response, the verification module 304 may communicate with the policy manager 308 to query whether the code assembly has been granted a permission to execute despite the failure to pass a type safety check.

The policy manager 308 may also be used to implement a trust decision for an application and/or application group based on application evidence it receives. Application evidence 321 may be received from one or more resource locations (e.g., server 300) as downloaded evidence 320 or may be provided on the computer system (e.g., client 302) as local evidence 322. The application evidence, security policy specification 326, manifest 325, and permission requests 324 are input to the policy manager 308 to make a trust decision.

The policy manager 308 may make a trust decision for an application and/or application group by applying the application evidence 321 to one or more of the conditions defined by the security policy specification 326. Optionally, the policy manager may also evaluate the application evidence 321 relative to one or more conditions defined by the security policy specification 326. The evaluation of application evidence is illustrated by way of example using the conditions and application evidence in Table 2 and Table 3.

TABLE 2

Exemplary Application Trust Decision

| Condition | Application Evidence | Satisfied? |
|---|---|---|
| Issuer X trusts Application Y | Application ID = Y | Yes |
| Issuer X can issue trust licenses | X has not issued a license For Y | No |

In the example shown in Table 2, the application evidence 321 provided for Application Y does not satisfy each of the conditions for trusting the application. Accordingly, the policy manager 308 determines that the application is not trusted and does not generate a permission grant set for the application component (e.g., code assembly) and the application cannot be loaded or executed on the client 302.

TABLE 3

Exemplary Application Trust Decision

| Condition | Evidence | Satisfied? |
|---|---|---|
| Issuer X trusts Application Z | Application ID = Z | Yes |
| Issuer X can issue trust licenses | X issued a license for Z | Yes |

In the example shown in Table 3, the application evidence 321 provided for Application Z satisfies the conditions which make Application Z a trusted application. Accordingly, the policy manager 308 computes the appropriate permission grants for the application component (e.g., code assembly) and passes a resulting permission grant set to the run-time call stack 318. Each code assembly belonging to the application is associated with a corresponding permission grant set (e.g., illustrated in FIG. 2).

Figure 4:
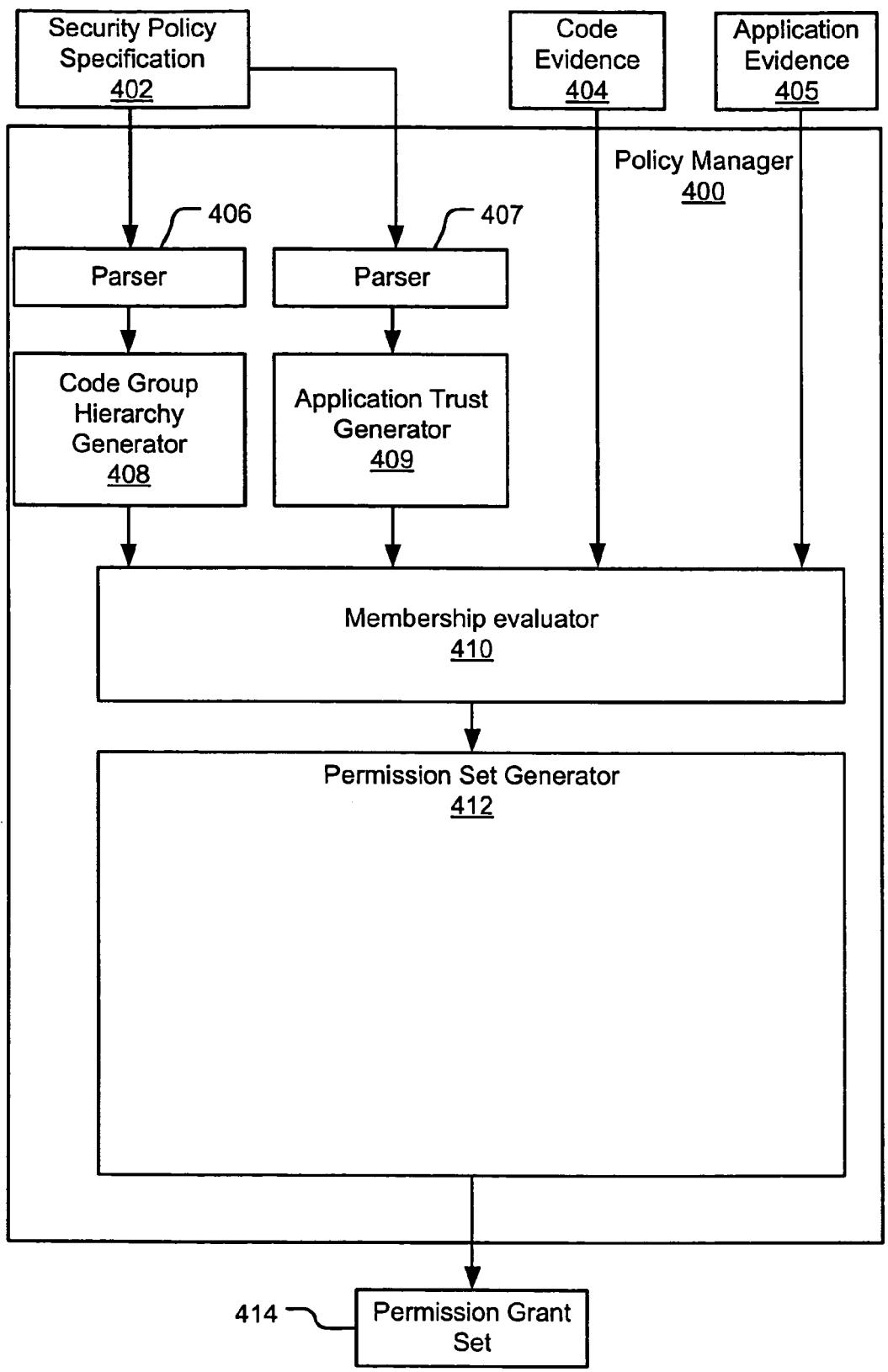
FIG. 4 depicts a policy manager for managing evidence-based security according to one implementation.

FIG. 4 depicts a policy manager for managing evidence-based security in an embodiment of the present invention. Executable components described relative to FIG. 4 may be implemented as software modules that are executable on a computer system. Alternatively, executable components implemented in hardware or in a combination of hardware and software are also contemplated in the scope of the present invention.

Figure 6:
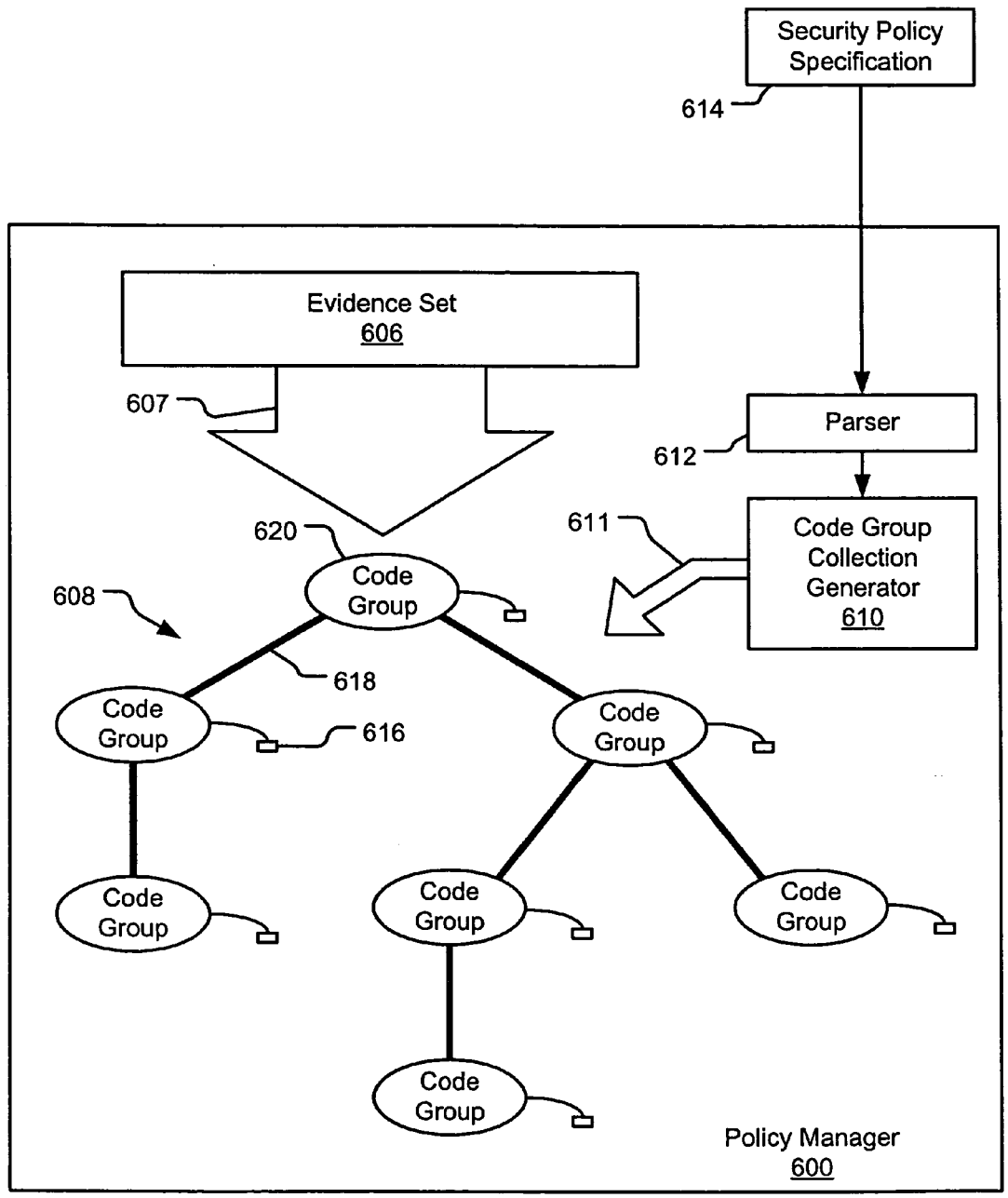
FIG. 6 illustrates a policy manager evaluating initially untrusted evidence according to one implementation.

A policy manager 400 is coupled to receive a security policy specification 402 and an evidence set 404. The security policy specification 402 specifies a definition of one or more code groups, which may be used to define a category of related code assemblies (e.g., code assemblies signed by a given publisher). In one embodiment, the code groups are configured into one or more code group collections that may share some common characteristics. Alternatively, code groups may be configured into one or more code group hierarchies. An exemplary code group hierarchy 608 is illustrated in FIG. 6. The security policy specification may also define one or more policy levels. The evidence set 404 defines trust characteristics associated with a code assembly received by a computer system. Although the evidence set 404 is shown as originating outside of the policy manager 400, it should be understood that the policy manager may dynamically generate or otherwise obtain evidence (e.g., from a network location) that is evaluated by the membership evaluator 410. Alternatively, evidence may be hard coded into a membership criterion associated with a code group generated by the code group generator 408.

In an embodiment of the present invention, a parser 406 receives the security policy specification 402 and extracts a definition of one or more code groups. Each code group is associated with a membership criterion, a child definition (specifying zero or more child code groups of the code group), and a code-group permission set. The membership criterion specifies the conditions of membership for a given code group, which an evidence set must satisfy in order for a corresponding code assembly to be deemed a member of the code group. The child code group definition specifies the children of a given code group, although a child code group definition is not required in all code group collections. For example, in a non-hierarchical code collections, child definitions are likely to be omitted. If a code assembly proves membership in a first code group (i.e., a parent code group), the code assembly will be considered for membership in the child code groups of the parent code group. Code-group permission sets represent collections of permissions that may be assigned to code groups. If a code assembly is determined to be a member of the code group, the permissions of the associated permission set may be granted to the code assembly, subject to other operations within the policy manager.

Other code group collection embodiments may include alternative data configurations. For example, in one embodiment, a code group collection is represented in a one-dimensional list of code groups, wherein each code group includes a membership criterion and a permission set, and omits a child code group definition of the previous discussion. In this embodiment, the one-dimensional list may be ordered or unordered.

In yet another code group collection, embodiments may include an application or application group. For example, in one embodiment, a code group collection is represented as one or more code assemblies which comprise an application. Alternatively, a code group collection may be represented as one or more applications which comprise an application group. Each code group includes a membership criterion and a permission set. Furthermore, other data configurations are contemplated within the scope of the present invention.

In an exemplary embodiment of the present invention, permission sets may be named to allow identification in the security policy specification 402. More than one code group may be assigned the same named permission set. As such, if a change is made to a named permission set (e.g., insertion or deletion of an individual permission), the change affects all of the code groups associated with that named permission set. For example, to grant the same permissions to several extranet business partner web sites that are members of different code groups, a single named permission set can be defined and assigned to the several code groups.

In an embodiment of the present invention, three types of named permission sets are supported: (1) standard permission sets—these sets are predefined and cannot be changed; (2) predefined permission sets—these sets may be modified by the administrator; and (3) custom permission sets—these sets may be defined by a user so long as the permission set names do not conflict with standard or predefined permission set names. In one embodiment, standard permission sets are available at all policy levels and may not be redefined in any individual policy level (universal scope). In this embodiment, the predefined and custom permission sets are defined and referenced within any given policy level and cannot be referenced from other policy levels (policy-level scope). It should be understood, however, that the scope of any permission set may extend beyond a given policy level in an alternative embodiment of the present invention.

Table 4 describes standard permission sets available in an embodiment of the present invention. Some standard permission sets, such as Internet and LocalIntranet sets, are predefined but may be modified by a user or an administrator. Other permission sets, such as SkipVerification, cannot be modified in an embodiment of the present invention. Alternative named permission sets are also contemplated within the scope of the present invention, and the named permission sets described in Table 4 may be modified without departing from the present invention.

TABLE 4

Standard Permission Sets

| Standard Permission Sets | Description |
| --- | --- |
| Nothing | The associated code assembly has no permissions (i.e., to execute, to read, to write, to create, to append, to customize, to assert, to use, etc.). |
| Execution | The associated code assembly has permission to execute, but no other permissions to use protected resources. |
| Internet | The associated code assembly has the default permissions suitable for content from unknown origin, including permissions to execute, to open safe windows on the user interface to access the clipboard, to create its own application domain, to store a limited amount of data in a secure area, etc. |
| LocalIntranet | The associated code assembly has the default permissions suitable for content originating from within an enterprise, including permissions to access environment variables containing the user's current username and temporary directory locations, to execute and assert, to broadly access the user interface, to store a limited amount of data in a secure area, etc. |
| Everything | The associated code assembly has permissions from all standard name permission sets. |
| SkipVerification | The verification process or a portion thereof may be skipped, or the code assembly has permission to fail verification or a portion thereof. |

The code-group permission set associated with a given code group may specify permissions associated with the code group. Alternatively, the code-group permission set associated with a given code group may specify permissions associated with the code group and all ancestor code groups. This flexibility allows a variety of security configurations (e.g., policy levels, permission sets, membership criteria, etc.) to be defined in a security policy specification. As discussed below, the policy manager may be developed to accommodate such a variety of security configurations.

In one embodiment, the security policy specification 402 may also specify multiple policy levels, each policy level having one or more code groups. The code groups may be configured into one or more code group collections or hierarchies. Policy levels allow an administrator, for example, to define different security policies for different machines, users, applications, time periods, user groups etc. When a membership evaluator 410 generates a policy-level permission set for a given policy level, the membership evaluator 410 traverses through the code groups associated with that policy level. The policy manager 400, therefore, can generate a permission set associated with the individual policy level. Thereafter, the permission sets from multiple policy levels may be processed (e.g., merged, selected, or filtered) to generate a resulting permission grant set 414.

Alternatively, the security policy specification 402 may specify one or more code group collections, and allocate the multiple policy levels across those code group collections. One method in which the allocation may be accomplished includes adding policy level properties to each code group. In this method, when the membership evaluator 410 traverses through the code group collections to determine the policy-level permission set for a given policy level, a code assembly is only determined to be a member of code groups associated with the policy level. To process multiple policy levels in this embodiment, the one or more code groups (or code group hierarchies) are traversed once for each policy level. Alternative methods for managing code groups, code group collections, and policy levels are contemplated with the scope of the present invention.

In the illustrated embodiment, a code group collection generator 408 receives the parsed definition from the parser 406 and generates one or more code group collection in the memory of the computer system. The membership evaluator 410 receives the evidence set 404 and extracts trust characteristics relating to the corresponding code assembly. The membership evaluator 410 traverses through a code group collection (see FIG. 6 for an illustration of an exemplary code group hierarchy 608) to determine whether the code assembly is a member of one or more of the code groups within the code group collection. A permission set generator 412 receives the membership determination from the membership evaluator 410 and generates the appropriate permission grant set 414.

In an implementation where the code groups represent an application and/or application, parser 407 may be implemented to extract evidence for the application or application group. It is noted that this function may also be accomplished by parser 406 in other implementations. Each application or application group is associated with a membership criterion and a permission set. The membership criterion specifies the conditions of membership in an application or application group, which application evidence 405 must satisfy in order for corresponding code assemblies to be deemed a member of the application or application groups.

The application trust generator 409 receives the parsed definition from the parser 407. Application trust generator 409 generates one or more applications in the memory of the computer system. The membership evaluator 410 receives the application evidence 405 and extracts trust characteristics relating to the corresponding application or group of applications. The membership evaluator 410 traverses through code assemblies to determine whether the code assemblies are members of one or more applications. Likewise, the membership evaluated 410 may traverse through applications to determine whether the applications are members of an application group. A permission set generator 412 receives the membership determination from the membership evaluator 410.

If a code assembly is determined to be a member of an application or application group defined by the manifest, the permission set generator 412 generates the appropriate permission grant set 414 for the code assemblies, subject to other operations within the policy manager 400. These permission sets represent collections of permissions that may be assigned to applications or application groups. Table 4, above, describes standard permission sets available according to one implementation, although the scope of the invention is not limited to use with these permission sets.

Figure 5:
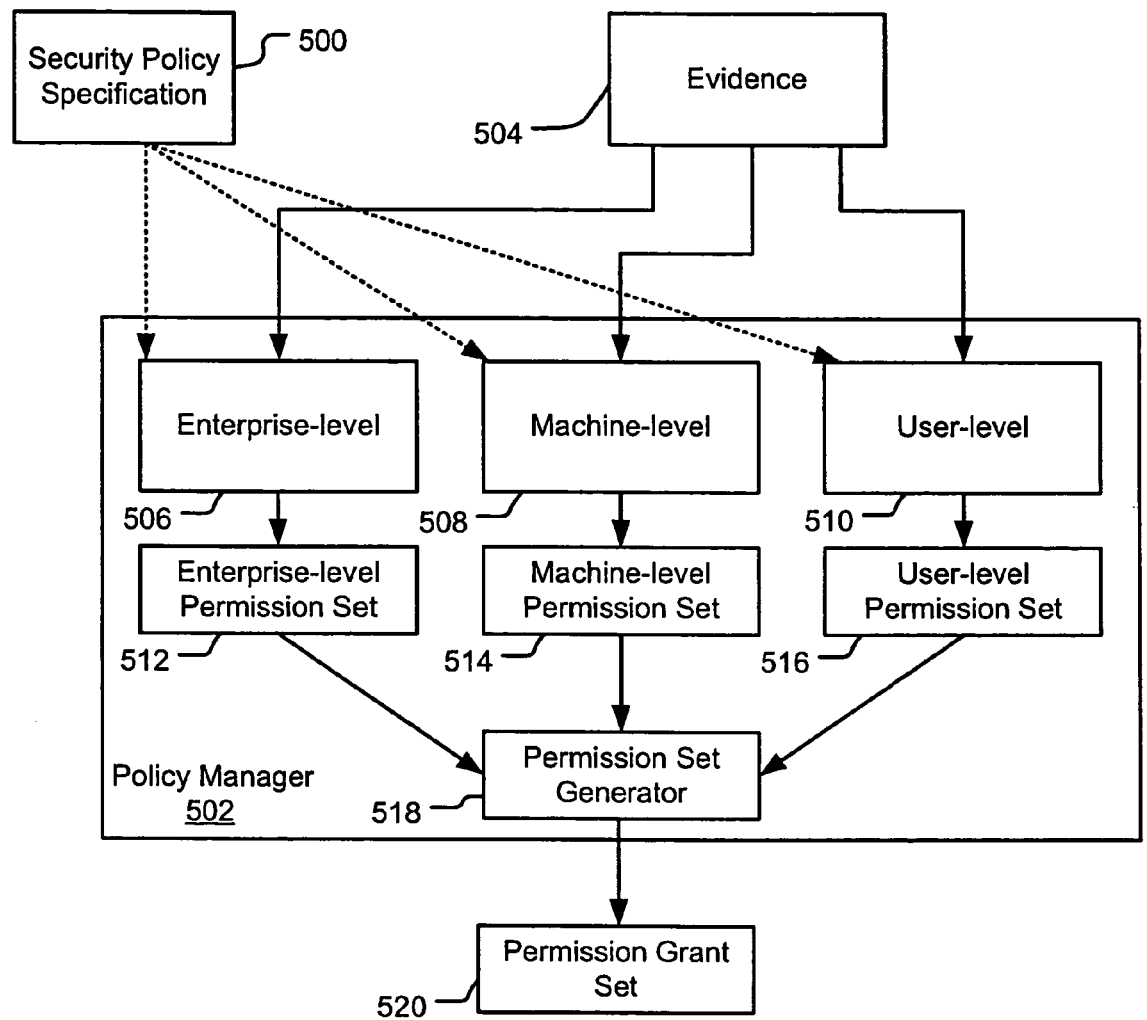
FIG. 5 depicts exemplary policy-levels on which a policy manager operates in one implementation.

FIG. 5 depicts exemplary policy-levels on which a policy manager operates in an embodiment of the present invention. A security policy specification 500 is processed on the policy manager 502 to generate one or more security policy levels 506, 508, and 510 (this processing is represented by the dotted lines pointing to each of the policy levels). In an embodiment of the present invention, the security policy specification 500 is written as an XML (eXtensible Markup Language) expression. In alternative embodiments, however, other data formats may be employed, including without limitation SGML (Standard Generalized Markup Language), HTML (HyperText Markup Language), RDF (Resource Description Framework), Visual Basic, and other standard and customized data and code formats.

In an embodiment of the present invention, the security policy specification 500 is a persistent representation of a security policy (e.g., an ordered collection of policy levels and/or code group collection), wherein each policy level is constructed of code groups. Lower order policy levels generally specify more restrictive policy restrictions than those of higher order policy levels. The security policy specification 500 is typically generated by a system administrator, a user, or an application setup program having appropriate permissions. Exemplary policy levels may include without limitation enterprise, machine, user, and application policy levels.

In one embodiment of the present invention, the highest level policy level is an enterprise policy level, which may define the security policy applied to all systems within any given enterprise. A lower policy level is a machine policy level, which may define the security policy applied to all users on a given system. A user policy level may define the security policy applied to a given user, regardless of which individual system the user is logged in to. An application policy level may define a security policy applied to a given application, regardless of the user or system executing the application. Additional policy levels and policy level orders are contemplated within the scope of the present invention.

The security policy specification 500 also manages security using one or more code group collections (e.g., hierarchical collections of code group levels), which are associated with membership criteria and contain or generate permission sets and special attributes. The security policy specification 500 consists of declarations of code groups with associated sets of permissions. A code assembly that is a member of a given code group may be granted permissions from the permission set associated with the code group. Code group membership is determined by the policy manager 502 using evidence set 504 associated with the code assembly, such as a digital signature, the origin of the code assembly, etc. An administrator may add a code group to the code group collection in order to grant additional permissions to code assemblies belonging to the new code group.

In an embodiment of the present invention, a code group may be attributed with an "Exclusive" property flag, which specifies that only the permissions associated with this particular code group are to be applied to the member code assembly. Permission sets from other member code groups are ignored (i.e., not merged).

In an embodiment of the present inventions, code groups are defined in a code group hierarchy having a root node corresponding to "all" code assemblies. The root node represents a parent code group having child nodes, each of which may also have child nodes, and so on, to form a code group hierarchy. Alternative code group collections and hierarchies are also contemplated within the scope of the present invention including without limitation ordered and unordered lists of code groups. If the policy manager 502 determines a code assembly is a member of a parent code group, then the code assembly is tested against the children of the parent code group to determine membership therein. Exemplary code group types and membership criteria are described in Table 5, although other code group types are contemplated within the scope of the present invention. Furthermore, code group types may be associated with a property. For example, a code group type "software publisher" may be associated with a specified publisher, "Microsoft", as in "Publisher: Microsoft".

TABLE 5

Exemplary Code Groups

| Code Group Types (label) | Membership Criterion Description |
|---|---|
| all code ("All Code") | All code assemblies are deemed members of this code group. |
| software publisher ("Publisher") | Code assemblies published by a specified publisher (e.g., Microsoft) and verified with a public key of a valid AUTHENTICODE signature are deemed members of this code group. |
| Zone ("Zone") | Code assemblies originating from a specified zone of origin (e.g., Internet, LocalIntranet, RestrictedSites, etc.) are deemed members of this code group. |
| strong name ("Name") | Code assemblies having a specified cryptographically signed name space (e.g., MS.Windows) are deemed members of this code group. |
| web site ("Site") | Code assemblies originating from a specified web site (e.g., www.microsoft.com or *.microsoft.com, where "*" represents a wildcard character) are deemed members of this code group. |
| URL ("URL") | Code assemblies originating from a specified resource location that includes a final wildcard character "*" (e.g., http://www.microsoft.com/app/*) are deemed members of this code group. |

Furthermore, the security policy specification 500 may define multiple policy levels. In the illustrated embodiment, each policy level (e.g., enterprise-level 506, machine-level 508, and user-level 510) has an individual code group hierarchy. As previously discussed, other policy level configurations may be employed within the scope of the present invention, such as a configuration in which multiple policy levels are allocated across one or more code group collections. For example, a single code-group hierarchy may have a single root node associated with multiple children, wherein each policy level is allocated to one child of the root node and the child's associated subtree.

In the illustrated embodiment, a policy-level permission set (e.g., enterprise-level permission set 512, machine-level permission set 514, or user-level permission set 516) is generated from each of the policy levels. A policy-level permission set merger 518 merges the policy-level permission sets 512, 514, and 516 to generate the permission grant set 520.

In an alternative embodiment, the policy-level permission set merger 518 may be replaced or supplemented by a policy-level permission set selector (not shown) to provide an alternative policy-level permission set generator. For example, in an embodiment of the present invention, a code-group permission set associated with an "exclusive" code group may supersede policy-level permission sets of other policy levels. As such, a policy-level permission set selector may be employed to select the code-group permission set associated with the "exclusive" code group, ignoring the policy-level permission sets of the other policy levels.

It is also noted application evidence can be evaluated to implement application-based security at different policy levels, such as at the enterprise, machine, user, and application policy levels as just described.

FIG. 6 illustrates a policy manager evaluating initially untrusted evidence in an embodiment of the present invention. Various pieces of evidence can be associated with different levels of trust. "Implicitly trusted" evidence refers to a suggestion of a given level of trust associated with the evidence (e.g., as applied within a membership criterion), whereas "initially untrusted" evidence refers to a suggestion of a given level of trust (or "distrust") upon receipt of the evidence by the policy manager. The level of trust assigned to a given piece of evidence need not be stated by the evidence itself nor need it be enforced uniformly within a given security policy or among multiple computer systems.

In addition, levels of trust may also be graduated or weighted. For example, a security policy specification may allocate values to various conditions in a membership criterion. In one embodiment, the more trusted a given element of evidence is, the greater the "trust" value associated with the condition, if the condition is satisfied. In an embodiment of the present invention, the values of satisfied conditions may be evaluated singly or in combination to determine whether the code assembly is a member of the associated code group. For example, the sum of the values may be compared against a predetermined threshold value. If the sum exceeds the threshold value, the code assembly is deemed a member of the code group. It should be understood that alternative methods of evaluating of such values may also be employed within the scope of the present invention.

In an embodiment of the present invention, whether a given element of evidence is designated "initially untrusted" or "implicitly trusted" may be defined by a given membership criterion. Furthermore, what may be "initially untrusted" by one membership criterion may be deemed "implicitly trusted" by another membership criterion. In alternative embodiments, an evidence resolver may be employed to resolve the trust characteristic of a given element of evidence (e.g., based on a set of security rules or conditions defined in the security policy specification).

Because evidence is used to determine the membership of a code assembly in one or more code groups, the level of "trust" associated with the evidence is an important factor. For example, evidence received from the host is generally deemed "implicitly trusted" by virtue of the membership criterions of individual code groups. This convention, however, may be modified by the security policy set forth in the security policy specification 614. In order to determine the permission set associated with a code assembly, received evidence is evaluated relative to one or more conditions associated with that evidence and that permission set. However, the level of trust associated with "implicitly trusted" evidence is generally independent of any other evidence and conditions (e.g., conditions associated with other evidence). An exemplary element of implicitly trusted evidence is a host-stored key, which can be used to verify signed digital certificates received in association with a code assembly. Another example of implicitly trusted evidence may be the URL from which the code assembly was downloaded, which is known by the host.

In contrast to implicitly trusted evidence, evidence received from other sources, such as the code assembly itself or from other resource locations, is generally deemed "initially untrusted", although this convention may also be modified by the security policy. Generally, the level of trust eventually associated with "initially untrusted" evidence is dependent upon other evidence and conditions. If evidence is initially untrusted, independent validation of the initially untrusted evidence may allow the policy manager to rely on the evidence when granting the appropriate permission grant set to the code assembly. Independent verification, for example, can be performed using an element of implicitly trusted evidence. An exemplary element of initially untrusted evidence is a signed certificate of a third-party received in association with a code assembly, which can be verified by a host-stored key provided by the third-party (an exemplary element of implicitly trusted evidence).

A digital certificate establishes credentials for a code assembly and may be issued by a certification authority (CA). For example, a certificate may contain the code assembly vendor's name, a serial number, expiration dates, a copy of the certificate holder's public key (used for encrypting and decrypting messages and digital signatures), and the digital signature of the certificate-issuing authority so that a recipient can verify that the certificate is real. Some digital certificates conform to a standard, X.509, for example.

A set of evidence 606 is received by the policy manager 600. Different elements of evidence may be received concurrently or at different times. Some elements of evidence may be received within a code assembly or merely referenced within a code assembly (e.g., by a URI or URL) and retrieved from a resource location at a different time. Alternatively, evidence may be stored in a storage region of the computer system (such as a system registry, a configuration file, etc.) or generated dynamically by the computer system or some other source. Thereafter, the code assembly can reference the evidence, which is retrieved from the computer system or other source. A policy manager may also receive evidence that is hard-coded into a membership criterion.

The evidence set 606 is evaluated within the code group collection 608. The arrow 607 represents the input and subsequent processing for the evidence set 606 within the code group collection 608, as described with regard to FIGS. 4 and 5. The code group collection 608 is generated (see arrow 611) by a code group collection generator 610, which receives security policy data read by the parser 612 from the security policy specification 614. The code group collection 608 is in the form of a code group hierarchy in the illustrated embodiment.

In an embodiment of the present invention, each node in the code group hierarchy 608 is associated with a membership criterion, which is represented by the bold line connecting two code group nodes (e.g., membership criterion 618), a child definition (if any), and a code-group permission set (e.g., code-group permission set 616). The root node 620 may also include a membership criterion; however, in one embodiment of the present invention, all code assemblies are members of the root node. Nevertheless, a more limiting membership criterion may also be associated with the root node.

Evidence from the evidence set 606 is evaluated to determine membership of the code assembly in one or more code groups in the code group hierarchy 608. When a code assembly is determined to be a member of a given code group, the corresponding permission set is associated with the code assembly. In an embodiment of the present invention, the association of a permission set may be dynamically generated. For example, as a result of a determination that the code assembly is a member of a given code group, the code assembly may also be evaluated against the membership criteria of child code groups of the given code group. In addition, an individual permission set of a given code group may be programmatically generated, rather than statically defined. For example, a user may be queried for information to provide enhanced permissions, or available permissions may be different depending on the time of day, or some other variable. A logical set operation may be used to combine or filter the one or more code-group permission sets, as identified by the code-group membership determinations. In one embodiment, a union of all the permission sets of all code groups in which the code assembly is deemed to be a member is used to produce a resulting code-group permission set.

In an exemplary embodiment of the present invention, the policy manager 600 may determine whether an application vendor has licensed appropriate rights to call a library that is installed on the user's computer system. For example, assume that a user has installed an encryption library on a computer system after purchasing a restricted license that allows the user to call the library from a given application. During installation of the library, the security policy is modified to include one or more code groups associated with permissions for calling the library. Each code group is associated with a membership criterion defining conditions for evaluating evidence associated with the code assembly. Based on these conditions, each element of evidence is treated as either implicitly trusted or initially untrusted.

At some later point, the user may attempt to download and execute a second application that also includes calls to the encryption library. A code assembly within the application may include an embedded certificate, signed by the library vendor, indicating that the code assembly vendor has also purchased rights to call the vendor's library on a user's system. However, because the certificate is provided by the application vendor, the certificate may be untrusted unless it can be independently verified with trusted evidence, such as a key provided by the library vendor. In addition, the key associated with the library may be installed in the computer system, as implicitly trusted evidence, such as by hard-coding the key into the membership criterion or installing it elsewhere within the computer system (or in another trusted location accessible by the computer system). Thereafter, if a given code assembly of the application calls the library, the policy manager 600 evaluates available evidence to determine whether to grant execution permission associated with code assembly's call to the library.

In the library scenario, exemplary initially untrusted evidence 602 may be represented by the certificate issued (signed) by the library vendor in the code assembly indicating that the code assembly is licensed to call the library. Implicitly trusted evidence 604 may be represented by the public key received from library vendor when the library was installed in the computer system. An exemplary membership criterion associated with a library vendor-installed code group, therefore, may have the following form involving two conditions and one logical operation (i.e., an AND operation):

(1) if the code assembly contains a signed statement indicating a license to call the library vendor's library, [the statement is applied as initially untrusted evidence]
AND
(2) the host verifies that the statement is signed by the library vendor, based on the host-installed public key, [the public key is applied as implicitly trusted evidence]
THEN the code assembly is a member of the library vendor-installed code group and the corresponding permission set is granted to the code assembly to allow the code assembly to call the library.

In an embodiment of the present invention, the operation of applying an element of evidence as either implicitly trusted or initially untrusted involves configuration of logical evidence dependencies (e.g., in a membership criterion) by an installation program, an administration process, a user action, or some other operation. Note that validation of the initially untrusted evidence (e.g. the signed statement) is conditional upon verification by or collaboration with implicitly trusted evidence (e.g., the key). In the above example, the key is designated as implicitly trusted because it does not require further independent verification or self-verification, as specified by the membership criterion of the given code group. However, a membership criterion of another code group may include conditions (1) and (2) and further require an additional condition, which, for example, may test whether the key was installed by an installation program that was executed by an administrator, instead of a normal user. In this second example, the additional condition designates execution of the installation program by an administrator as implicitly trusted evidence, whereas the key itself is initially untrusted.

In the first library example above, there is direct logical dependency between the initially untrusted evidence and the implicitly trusted evidence. A direct logical dependency refers to a membership criterion in which the element of initially untrusted evidence is validated by an individual, although not necessarily unique, element of trusted evidence.

Alternatively, as described in the second library example above, an indirect logical dependency may also be defined in a membership criterion. An indirect logical dependency refers to a membership criterion, for example, in which a first element of initially untrusted evidence must be validated by a second element of initially untrusted evidence that has been validated by a third element of trusted evidence. In addition, one or more elements of initially untrusted evidence may be evaluated in combination with one or more elements of implicitly trusted evidence. An indirect logical dependency allows for evaluation of an evidence chain (or web) in which one or more terminals of the chain are characterized by trusted evidence. In each type of dependency (i.e., direct or indirect), the initially untrusted evidence is eventually validated by implicitly trusted evidence.

To further describe the utility of indirect logical dependencies, one can consider a chain of initially untrusted evidence, which may be referred to as "certificate chain-building" or "certificate path validation". For example, a code assembly may include signed certificate from library vendor A, stating that the code assembly may access vendor A's library, which is installed on the user's system. However, in this scenario, the certificate is signed by potentially trusted vendor B (e.g., VeriSign, which provides Internet trust services). If the host possesses a key with which to verify the signature of vendor B (a direct logical dependency), then the code assembly may be deemed a member of a first code group with an associated permission set that allows execution of the code assembly.

However, if the host does not have a key with which to verify the signature of vendor B, then the code assembly may also include initially untrusted evidence including a statement signed by potentially trusted vendor C (e.g., Microsoft) certifying the certificate signed by vendor B is verified. Accordingly, a second code group may exist that specifies an indirect dependency in a membership criterion having following form, which includes three conditions and two logical operations (i.e., two AND operations):

(1) if the code assembly includes (or is associated with) a first signed statement from vendor A and signed by vendor B indicating a license to call vendor A's library, [the first signed statement is applied as initially untrusted evidence]

AND (2) the code assembly includes (or is associated with) a second signed statement published and signed by vendor C indicating that the first signed certificate is properly signed by vendor B and can be trusted, [the second signed statement is applied as initially untrusted evidence]

AND (3) the host verifies that the second signed statement is signed by vendor C, based on a public key for vendor C installed on the computer system, [the public key is applied as implicitly trusted evidence]

THEN code assembly is a member of the vendor A-installed second code group and the corresponding permission set is granted to the code assembly.

It should be understood that both implicitly trusted evidence and initially untrusted evidence may be, without limitation, stored within the host, hard-coded within a membership criterion, embedded within a code assembly, or retrieved from another resource location or during another network access. In any circumstance; however, the evidence source, evidence version, retrieval timing, user name, etc. may be employed by a membership criterion or evidence resolver to determine the level of trust of a given element of evidence and ultimately the permissions granted to the associated code assembly. It should also be understood that other conditions and logical operations (e.g., OR, XOR, NOR, NOT, add, subtract, etc.) may be employed within the scope of the present invention.

In addition, application evidence can also be evaluated to implement application-based security using "implicitly trusted" evidence and "initially untrusted" evidence as just described.

Figure 7:
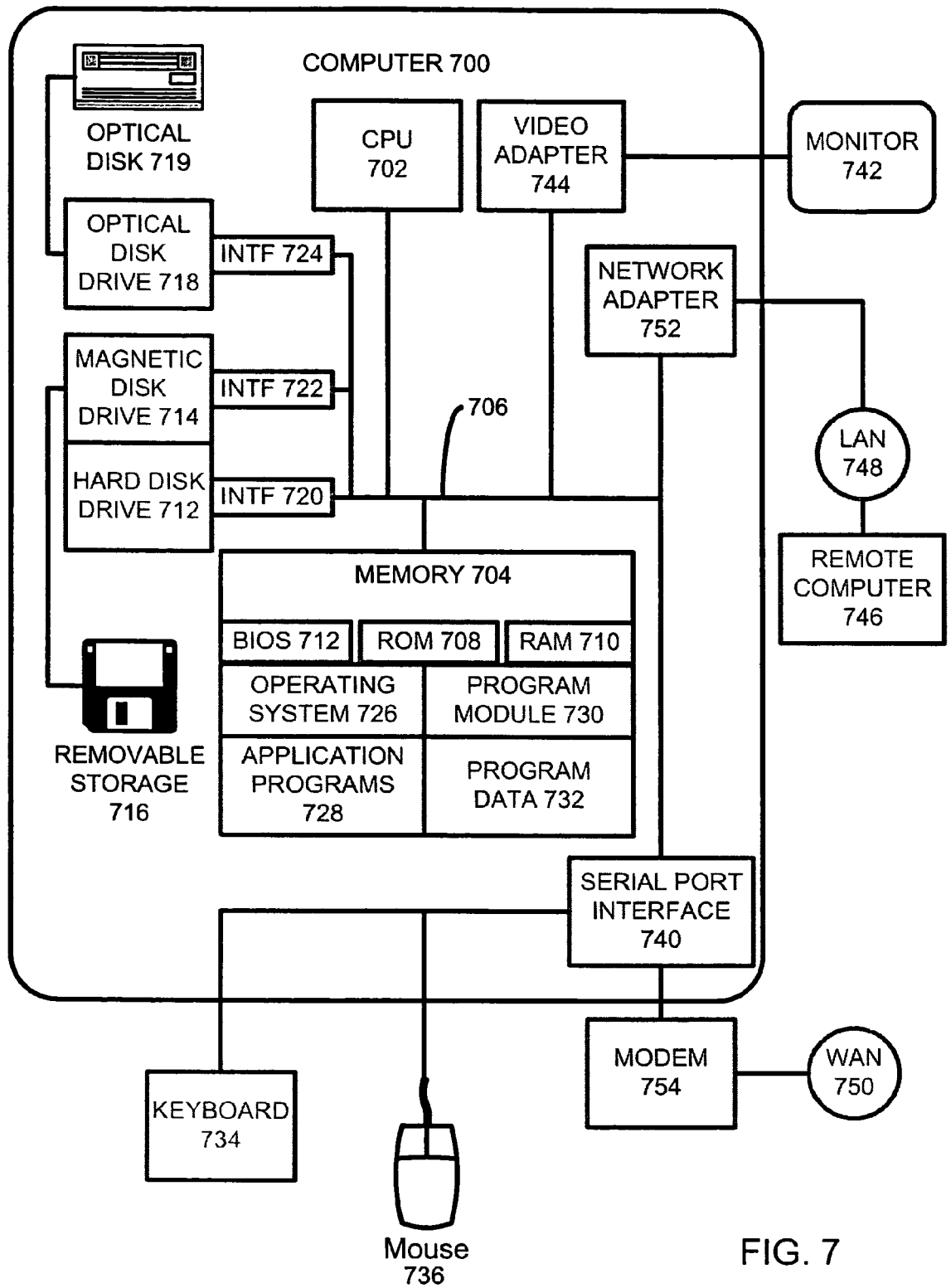
FIG. 7 illustrates an exemplary computing device that can be utilized to implement a host or a client on a network.

FIG. 7 illustrates an exemplary system useful for implementing an embodiment of the present invention. An exemplary computing system for embodiments of the invention includes a general purpose computing device in the form of a conventional computer system 700, including a processor unit 702, a system memory 704, and a system bus 706 that couples various system components including the system memory 704 to the processor unit 700. The system bus 706 may be any of several types of bus structures including a memory bus or memory controller, a peripheral bus and a local bus using any of a variety of bus architectures. The system memory includes read only memory (ROM) 708 and random access memory (RAM) 710. A basic input/output system 712 (BIOS), which contains basic routines that help transfer information between elements within the computer system 700, is stored in ROM 708.

The computer system 700 further includes a hard disk drive 712 for reading from and writing to a hard disk, a magnetic disk drive 714 for reading from or writing to a removable magnetic disk 716, and an optical disk drive 718 for reading from or writing to a removable optical disk 719 such as a CD ROM, DVD, or other optical media. The hard disk drive 712, magnetic disk drive 714, and optical disk drive 718 are connected to the system bus 706 by a hard disk drive interface 720, a magnetic disk drive interface 722, and an optical drive interface 724, respectively. The drives and their associated computer-readable media provide nonvolatile storage of computer readable instructions, data structures, programs, and other data for the computer system 700.

Although the exemplary environment described herein employs a hard disk, a removable magnetic disk 716, and a removable optical disk 719, other types of computer-readable media capable of storing data can be used in the exemplary system. Examples of these other types of computer-readable mediums that can be used in the exemplary operating environment include magnetic cassettes, flash memory cards, digital video disks, Bernoulli cartridges, random access memories (RAMs), and read only memories (ROMs).

A number of program modules may be stored on the hard disk, magnetic disk 716, optical disk 719, ROM 708 or RAM 710, including an operating system 726, one or more application programs 728, other program modules 730, and program data 732. A user may enter commands and information into the computer system 700 through input devices such as a keyboard 734 and mouse 736 or other pointing device. Examples of other input devices may include a microphone, joystick, game pad, satellite dish, and scanner. These and other input devices are often connected to the processing unit 702 through a serial port interface 740 that is coupled to the system bus 706. Nevertheless, these input devices also may be connected by other interfaces, such as a parallel port, game port, or a universal serial bus (USB). A monitor 742 or other type of display device is also connected to the system bus 706 via an interface, such as a video adapter 744. In addition to the monitor 742, computer systems typically include other peripheral output devices (not shown), such as speakers and printers.

The computer system 700 may operate in a networked environment using logical connections to one or more remote computers, such as a remote computer 746. The remote computer 746 may be a computer system, a server, a router, a network PC, a peer device or other common network node, and typically includes many or all of the elements described above relative to the computer system 700. The network connections include a local area network (LAN) 748 and a wide area network (WAN) 750. Such networking environments are commonplace in offices, enterprise-wide computer networks, intranets, and the Internet.

When used in a LAN networking environment, the computer system 700 is connected to the local network 748 through a network interface or adapter 752. When used in a WAN networking environment, the computer system 700 typically includes a modem 754 or other means for establishing communications over the wide area network 750, such as the Internet. The modem 754, which may be internal or external, is connected to the system bus 706 via the serial port interface 740. In a networked environment, program modules depicted relative to the computer system 700, or portions thereof, may be stored in the remote memory storage device. It will be appreciated that the network connections shown are exemplary, and other means of establishing a communication link between the computers may be used.

In the illustrated embodiment, a security policy specification may be read from a file on the hard disk drive 712, for example, into memory 704. The CPU 702 executes memory-resident instruction code for a computer processes that implement a virtual machine and that generates a permission grant set for a code assembly received from a resource location based on evidence characterized by different levels of trust. Furthermore, the CPU 702 executes the software components that implement the policy manager recited in the claims.

Figure 8:
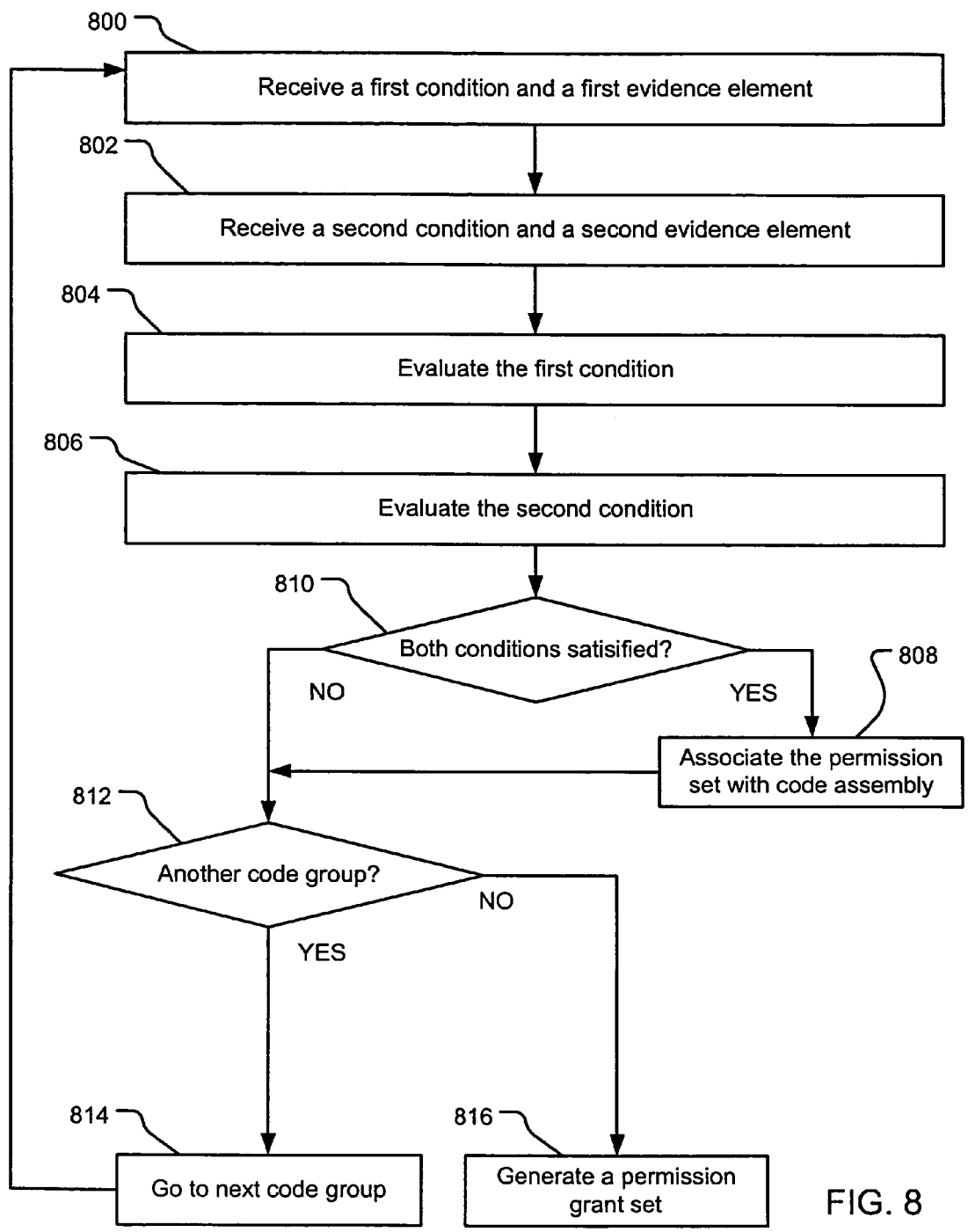
FIG. 8 illustrates a flow diagram of exemplary operations implemented to associating a permission set with a code assembly based on evidence characterized by different levels of trust in an embodiment of the present invention.

FIG. 8 illustrates a flow diagram of operations for associating a permission set with a received code assembly based on evidence characterized by different levels of trust in an embodiment of the present invention. Receiving operation 800 receives a first condition and a first evidence element. Receiving operation 802 receives a second condition and a second evidence element. In one embodiment of the present invention, the conditions are received in the form of a membership criterion associated with a code group of a code group collection. The permission set is also associated with the code group. In an alternative embodiment, the conditions may be specified by a security policy specification and applied by an evidence resolver that evaluates the evidence of the code assembly to determine which evidence may be trusted.

The evidence may be received from a variety of sources, including the code assembly itself, another resource location, and the computer system in which the policy manager is executing. The evidence may also be hard-coded into a condition. Furthermore, evidence is not limited to statically encoded data within the scope of the present invention. For example, the evidence may be generated dynamically by its source before being received in the receiving operations 800 and 802.

Evaluating operation 804 evaluates the first condition using the first evidence element as a parameter. Likewise, evaluating operation 806 evaluates the second condition using the second evidence element as a parameter. Decision operation 810 determines whether both conditions are satisfied. If so, the permission set with which the conditions were associated is then associated with the code assembly in associating operation 808. Decision operation 812 determines whether another code group exists against which the code assembly may be evaluated. If so, processing proceeds to the next code group in operation 814 and then repeats the process starting with receiving operation 800. Otherwise, grant operation 816 generates a permission grant set based on the permission set.

In an embodiment of the present invention, the conditions of receiving operations 800 and 802 are received in a membership criterion associated with a given code group. The membership criterion is used to determine whether a received code assembly is a member of the given code group. If so, the permission set associated with the code group is associated with the code assembly. In some circumstances, the associated permission set is equivalent to a permission grant set applied against the code assembly during run time. Alternatively, the permission set, and other permission sets associated with the code assembly, are later processed (e.g., by a permission set generator) using logical set operations. As a result, individual permissions provided in the associated permission set may be omitted, filtered, or merged with other permissions of other associated permission sets.

It should be understood, however, that the resulting permission grant set may eventually not include any permissions from an individual permission set associated with code assembly in the associating operation 808. Nevertheless, during processing, individual permission sets from the associating operation 808 are associated with the code assembly based on the conditions and evidence evaluated in evaluating operations 804 and 806, if only to be omitted later. For example, merging and filtering operations performed by permission set generator 518 of FIG. 5 may later omit individual permissions from the resulting permission grant set.

In an alternative embodiment, one or more conditions may be processed to dynamically generate evidence that is thereafter processed by another condition. For example, consider a membership criterion having the following form:

(1) If the code assembly includes (or is associated with) a first signed statement from vendor A and signed by vendor B indicating a license to call vendor A's library [the first signed statement is designated as initially untrusted evidence], then dynamically generating an indication that this condition (1) is satisfied

AND (2) the code assembly includes (or is associated with) a second signed statement published and signed by vendor C indicating that the first signed certificate is properly signed by vendor B and can be trusted [the second signed statement is designated as initially untrusted evidence], then dynamically generating an indication that this condition (2) is satisfied

AND (3) the code assembly includes (or is associated with) a third signed statement published and signed by vendor D indicating that the first signed certificate is properly signed by vendor B and can be trusted [the third signed statement is designated as initially untrusted evidence], then dynamically generating an indication that this condition (3) is satisfied

AND (4) the indications generated by conditions (1), (2), and (3) designate that condition (1) and at least one of conditions (2) and (3) are satisfied [the specified combination of satisfied conditions is designated as implicitly trusted evidence], THEN the code assembly is a member of the code group associated with the membership criterion and the corresponding permission set is granted to the code.

In this embodiment, the first three conditions generate indications that are received as initially untrusted evidence and processed in condition (4). The result of condition (4) is generated based on the indications received from conditions (1), (2), and (3). Alternatively, condition (4) may also generate one or more additional indication that are received by one or more additional conditions and processed accordingly. Furthermore, weighted or unweighted values may be attributed to conditions that are satisfied and produced as the indications discussed above (e.g., an indication that a condition has been satisfied may be defined by a positive value, whereas an indication that a condition has not been satisfied may be defined by a zero). The values of such conditions may then be evaluated to determine if the code assembly is a member of the associated code group. For example, if the sum of such values exceeds a predetermined threshold, then the code assembly may be deemed a member of the associated code group.

In another embodiment, negative values may be used to indicate unsatisfied conditions. This embodiment adds another aspect to the evaluation of a code assembly. For example, a condition may have zero value associated with it, if an expected element of evidence is not present in a code assembly (e.g., no certificate is embedded in the code assembly), whereas another condition may have a large negative number is the certificate is found but not properly signed. Thereafter, the results (i.e., the indications) of these conditions may be evaluated alone or in combination with other conditions to determine whether the code assembly is a member of the associated code group. It should be understood that other combinations of conditions and indications may be employed within the scope of the present invention.

Figure 10:
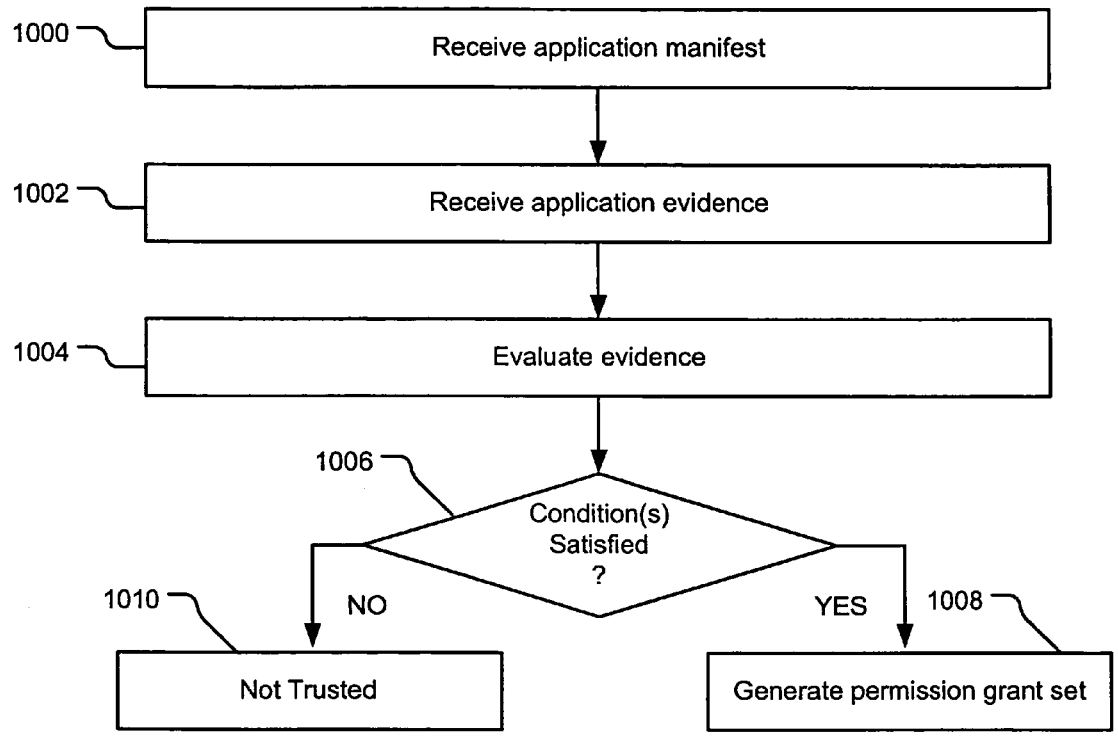
FIG. 10 illustrates a flow diagram of exemplary operations implemented to for evidence-based application security.

FIG. 10 illustrates a flow diagram of operations for an exemplary implementation of evidence-based application security. A manifest defining a trusted application or application group and associated evidence for making a trust decision is received in operation 1000. Optionally, a security policy specification may also be received defining conditions for making a trust decision. Evidence associated with the application is received in operation 1002. In operation 1004, the application evidence is evaluated to determine if an application is trusted. The application evidence may be similarly evaluated to determine if a group of applications are trusted. A trust decision is made in operation 1006. If the application evidence satisfies the condition(s) to trust an application or application group, one or more permission grants or grant sets for each component (e.g., code assembly) is generated in operation 1008 and the resulting permission grant or grant sets is passed to the run-time call stack. In an alternative embodiment, one or more conditions may be processed to dynamically generate evidence that is thereafter processed by another condition. In any event, if the application evidence does not satisfy the condition(s) to trust an application or application group, the resulting permission grant set does not include any permissions.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

We claim:

1. A computer-readable storage media comprising computer-executable instructions that, when executed by a processor, perform steps comprising:

receiving a manifest defining first, second, and third code assemblies that are members of at least one application, wherein the manifest defines at least one trusted application and application evidence for making a trust decision;

evaluating the application evidence to determine if the at least one application is trusted;

generating a first, a second, and a third permission grant set for the first, the second, and the third code assemblies, respectively, that are members of the at least one application if the application evidence satisfies at least one condition for trusting the at least one application;

passing the permission grant sets to a run-time call stack;

calling the second code assembly by the first code assembly;

calling the third code assembly by the second code assembly, the third code assembly attempting access of a protected file; and calculating an intersection of the first and the second permission grant sets to determine whether the access to the protected file is permitted.

2. The computer-readable storage media of claim 1 wherein the manifest further defines a plurality of code assemblies, the method further comprising evaluating application evidence for a group of applications and generating a permission grant set for each code assembly that is a member of the group of applications if the application evidence satisfies at least one condition for trusting the group of applications.

3. The computer-readable storage media of claim 1 wherein evaluating application evidence is based at least in part on an XrML license.

4. The computer-readable storage media of claim 1 further comprising evaluating application evidence at an application level and a code assembly level before trusting the at least one application.

5. The computer-readable storage media of claim 1 further comprising evaluating application evidence at a group level, an application level, and a code assembly level before trusting the at least one application.

6. The computer-readable storage media of claim 1 further comprising determining if the first and second code assemblies are members of the at least one application.

7. The computer-readable storage media of claim 1 wherein satisfying at least one trust condition is based at least in part on evidence provided with the at least one application.

8. The computer-readable storage media of claim 1 wherein satisfying at least one trust condition is based at least in part on evidence external to the at least one application.

9. The computer-readable storage media of claim 1 wherein satisfying at least one trust condition is based on evidence from user interaction.

10. The computer-readable storage media of claim 1 wherein satisfying at least one trust condition is based on evidence from evaluation of previous trust decisions.

11. A computer-readable storage media comprising computer-executable instructions that, when executed by a processor, perform steps comprising:
receiving a manifest defining first, second, and third code assemblies that are members of at least one application, wherein the manifest defines at least one trusted application and application evidence for making a trust decision;
evaluating the application evidence to determine if the at least one application is trusted;
generating a first, a second, and a third permission grant set for the first, the second, and the third code assembly, respectively, that are members of the at least one application if the application evidence satisfies at least one condition for trusting the at least one application;
passing the permission grant to a run-time call stack;
calling the second code assembly by the first code assembly;
calling the third code assembly by the second code assembly, the third code assembly attempting access of a protected file; and
calculating an intersection of the first and the second permission grant sets to determine whether the access to the protected file is permitted, wherein both the first and the second permission grant sets need a permission to read the protected file such the third code assembly is permitted to access the protected file.

12. The computer-readable storage media of claim 11 wherein the manifest further defines a plurality of code assemblies and evaluating application evidence for a group of applications and generating a permission grant set for each code assembly that is a member of the group of applications if the application evidence satisfies at least one condition for trusting the group of applications.

13. The computer-readable storage media of claim 11 wherein the computer process further comprises evaluating application evidence based at least in part on an XrML license.

14. The computer-readable storage media of claim 11 further comprising evaluating application evidence at an application level and a code assembly level before trusting the at least one application.

15. The computer-readable storage media of claim 11 further comprising evaluating application evidence at a group level, an application level, and a code assembly level before trusting the at least one application.

16. The computer-readable storage media of claim 11 further comprising determining if the first and second code assemblies are members of the at least one application.

17. The computer-readable storage media of claim 11 wherein the computer-executable instructions are based at least in part on evidence provided with the at least one application.

18. The computer-readable storage media of claim 11 wherein the computer-executable instructions are based at least in part on evidence external to the at least one application.

19. The computer-readable storage media of claim 11 wherein the computer-executable instructions are based on evidence from user interaction.

20. The computer-readable storage media of claim 11 wherein the computer-executable instructions are based on evidence from evaluation of previous trust decisions.

21. A system comprising:
a processor;
a memory accessed by and operated on by the processor;
a manifest, configured as part of the memory, defining first, second, and third code assemblies that are members of at least one application, the first code assembly being a main code assembly, the second code assembly being a parser code assembly, and the third code assembly being a file access code assembly;
application evidence, stored in the memory, to determine whether the at least one application is trusted;
a loader, stored in the memory, to load the first, the second, and the third code assemblies into a run-time call stack, with the first code assembly calling the second code assembly, the second code assembly calling the third code assembly, with the third code assembly attempting access of a protected file; and
a policy manager, stored in the memory, to evaluate the application evidence relative to at least one condition, wherein the policy manager generates a first, second, and third permission grant set for the first, the second, and the third code assembly, respectively, that are members of the at least one application if the application evidence satisfies the at least one condition specified in a security policy specification for trusting the at least one application, wherein the security policy specification defines multiple policy levels, and wherein permissions are granted on a computer system based on the permission grant set, the policy manager further calculating an intersection of the first and the second permission grant sets to determine whether the access to the protected file by the third code assembly is permitted, wherein both the first and the second permission grant sets need a permission to read the protected file such the third code assembly is permitted to access the protected file.

22. The system of claim 21 further comprising an XrML program authorization module, configured as part of the memory, operatively associated with the policy manager for evaluating application evidence including at least one XrML license.

23. The system of claim 21 wherein the policy manager evaluates evidence at a group level, an application level, and a code assembly level before the at least one application is executed.

24. The system of claim 21 wherein the policy manager further determines if the first and second code assemblies are members of the at least one application.

25. The system of claim 21 wherein the application evidence is provided with the at least one application.

26. The system of claim 21 wherein the application evidence is provided external to the at least one application.

27. The system of claim 21 wherein the application evidence includes at least an XrML license.

28. The system of claim 21 wherein the application evidence includes evidence provided via user interaction.

29. The system of claim 21 wherein the application evidence includes evidence from the evaluation of previous trust decisions.

30. The system of claim 21 further comprising a security policy specification defining at least one trust condition for an application component, wherein the policy manager evaluates the at least one trust condition in the security policy specification.

* * * * *